United States Patent [19]
Bosley et al.

[11] Patent Number: 5,850,733
[45] Date of Patent: Dec. 22, 1998

[54] GASEOUS FUEL COMPRESSION AND CONTROL SYSTEM AND METHOD

[75] Inventors: Robert W. Bosley, Cerritos; Edward C. Edelman, Agoura Hills; Ronald F. Miller, Marina del Rey, all of Calif.

[73] Assignee: Capstone Turbine Corporation, Tarzana, Calif.

[21] Appl. No.: 85,817

[22] Filed: May 27, 1998

Related U.S. Application Data

[62] Division of Ser. No. 730,945, Oct. 16, 1996, Pat. No. 5,819,524.

[51] Int. Cl.$^6$ .................................................. F02C 9/26
[52] U.S. Cl. ................................... 60/39.464; 60/39.281; 60/734
[58] Field of Search ........................... 60/39.465, 39.281, 60/39.511, 39.25, 734; 415/55.1

[56] References Cited

U.S. PATENT DOCUMENTS

| | | | |
|---|---|---|---|
| 2,599,480 | 6/1952 | Pfenninger | 60/39.25 |
| 2,864,237 | 12/1958 | Coleman, Jr. | 60/39.511 |
| 3,104,524 | 9/1963 | Flanders | 60/39.465 |
| 3,199,293 | 8/1965 | Starkey | 60/39.25 |
| 4,274,253 | 6/1981 | Bollinger et al. | 60/39.25 |
| 4,441,156 | 4/1984 | Barbeau | 60/39.281 |
| 4,523,517 | 6/1985 | Cronin | 290/4 C |
| 4,773,846 | 9/1988 | Munk | 60/39.511 |
| 4,815,278 | 3/1989 | White | 60/39.281 |
| 5,020,314 | 6/1991 | Brophy et al. | 60/734 |
| 5,148,670 | 9/1992 | Birch et al. | 60/39.511 |
| 5,497,615 | 3/1996 | Noe et al. | 60/39.511 |
| 5,599,163 | 2/1997 | Heath et al. | 415/55.1 |
| 5,606,853 | 3/1997 | Birch et al. | 60/39.281 |

*Primary Examiner*—Timothy S. Thorpe
*Assistant Examiner*—Ted Kim
*Attorney, Agent, or Firm*—Albert J. Miller

[57] ABSTRACT

A gaseous fuel compression and control system is disclosed which utilizes one or more helical flow compressor/turbine integrated with a permanent magnet motor/generator and driven by a torque controlling inverter to compress or expand gaseous fuels, precisely control fuel pressure and flow, and precisely control the operations (speed, combustion temperature and output power) of a gaseous fuel fired turbogenerator.

20 Claims, 11 Drawing Sheets

GASEOUS FUEL COMPRESSION AND CONTROL SYSTEM AND METHOD

This application is a division of application Ser. No. 08/730,945, filed Oct. 16, 1996, now U.S. Pat. No. 5,819,524.

TECHNICAL FIELD

This invention relates to the general fields of gaseous fuel compression and fuel control in terms of both systems and methods and more particularly to an improved system and method that utilizes a helical flow compressor/turbine permanent magnet motor/generator to compress and control gaseous fuel used by a turbogenerator.

BACKGROUND OF THE INVENTION

When a turbogenerator utilizes gaseous fuel to generate electricity, it is typically using natural gas from a natural gas pipeline. If the natural gas pipeline is in a residential or commercial area, the gas pressure is probably about two-tenths of a pound per square inch above atmospheric pressure (0.2 psig). The natural gas pipeline pressure is kept this low in residentially and commercially zoned areas for fire safety reasons. A line leak or line break at higher pressures could release massive amounts of natural gas into populated areas with the attendant risk of explosion and fire. In industrial locations, the natural gas pipeline pressure can be anywhere from twenty (20) psig to sixty (60) psig. Each natural gas pipeline has its own gas pressure standard. The utilities that supply these pipelines make little warranty of what that pressure will be or that it will be maintained at a relatively constant level.

A turbogenerator may need natural gas supplied to its combustor nozzle manifold at a pressure as low as one (1) psig when the turbogenerator is being started or at a pressure as high as forty (40) psig when the turbogenerator is being operated at full speed and at fall output power. One type of turbogenerator can operate and generate power at any speed between twenty-five thousand (25,000) rpm and one hundred thousand (100,000) rpm. Over this speed range, the gaseous fuel supply pressure requirements (in psig) can vary by twenty-five-to-one (25:1) and the gaseous fuel supply flow requirements can vary by twenty-to-one (20:1). The turbogenerator speed, combustion temperature and output power are controlled by the fuel pressure and the fuel flow rate established by the turbogenerator fuel control system. The pressure and flow of the gas delivered to the turbogenerator manifold must be precisely controlled (e.g. to within 0.01%) to adequately control the turbogenerator speed, combustion temperature and output power.

A fuel control system for a turbogenerator needs to be able to reduce the natural gas pressure when the turbogenerator is being started or operated at low speed and low output power. But this fuel control system must also be able to increase the natural gas pressure when the turbogenerator is operated at high speed and high output power. Thus, the fuel control system must have gas compression capability to increase the gas pressure. But it can reduce the gas pressure with either valves using Joule-Thompson expansion (which is wasteful of power) or with a turbine (which recovers the energy of the expanding natural gas and converts this into electrical power).

Most conventional gaseous fuel compression and control systems for turbogenerators utilize an oil lubricated reciprocating compressor driven by a three (3) phase, sixty (60) cycle induction motor to boost the natural gas pressure from whatever line pressure is available to a pressure of about one hundred (100) psig. There is typically an accumulator tank and a pressure sensor at the discharge of the reciprocating compressor. When the discharge pressure reaches about one hundred (100) psig, the pressure sensor turns the compressor motor off. The accumulator supplies the required turbogenerator gas flow when the compressor motor is turned off. The accumulator pressure decays with time until the pressure sensor determines that the pressure is below about sixty (60) psig, at which time it turns the compressor motor on again, Once again the pressure rises to about one hundred (100) psig at which point the pressure sensor turns the compressor motor off. This process of pressure ramp up and pressure decay (from sixty (60) psig to one hundred (100) psig and back) continues as long as the turbogenerator is in operation. The compressor/accumulator discharge gas pressure is too high and poorly regulated for direct use by a turbogenerator, This pressure is regulated downward to match the requirements of the turbogenerator by a very precise mass flow control valve.

The mass flow control valve typically has a mass flow sensor that is insensitive to gas pressure, gas density, or gas temperature. The valve is a servosystem in its own right, adjusting its internal electromechanical orifice to prevent accumulator pressure variations from affecting the mass flow rate of natural gas delivered to the turbogenerator and to assure that the mass flow delivered to the turbogenerator is that commanded by the turbogenerator computer. The turbogenerator computer monitors the output power currently being demanded of the turbogenerator by the electrical load, computes the required changes in turbogenerator speed and combustion temperature required to supply that power, limits turbogenerator speed and combustion temperature to safe levels, then computes the mass flow of fuel required to achieve the latest desired turbogenerator speed and combustion temperature. The mass flow control valve is then commanded to deliver this mass flow rate.

The use of oil lubricated reciprocating compressors, fixed speed compressor motors, accumulators, on-off pressure control, mass flow control valves, etc. in conventional fuel control systems results in numerous shortcomings:

The fuel control system can be as large and heavy as the turbogenerator it supplies with gas and controls.

The fuel control system can be as expensive as the turbogenerator it supplies with gas and controls.

An oil coalescing filter with an oil return to the compressor oil sump as well as a depth filter are needed at the discharge of the compressor to prevent oil from contaminating the natural gas lines leading to the turbogenerator as well as contaminating the turbogenerator's nozzles, combustor and catalyst.

If the oil coalescing filter and depth filter allow oil vapors or oil droplets to reach the natural gas lines leading to the turbogenerator, oil condensation and coalescing will allow liquid oil to plug these lines resulting in severe turbogenerator speed surges.

If the oil coalescing filter and depth filter allow oil vapors or oil droplets to reach the turbogenerator's nozzles or combustor, varnish build up will affect combustion adversely.

If the oil coalescing filter and depth filter allow oil vapors or oil droplets to reach any catalyst used by the turbogenerator in its combustion or post combustion emissions control, the catalyst will be poisoned and will cease to function.

The compressor needs periodic servicing to check its oil level, top off its oil level and to change its oil. The filters require checking and periodic replacement.

Turning the compressor on and off to control accumulator tank pressure shortens the compressor and motor life.

The rings, rotary seals and sliding surfaces of the compressor wear and thus limit compressor life.

The rotary seals of some compressor types can leak natural gas, especially after the passage of time and accumulated wear.

The compressor produces pressure pulsations each time its piston strokes. These pulsations have to be overcome by compressing the gas to a higher pressure than would otherwise be needed (wasting power) and by the use of an accumulator tank and a fast acting mass flow control valve having a very high gain servo system.

The compressor/accumulator discharge pressure ramps up and decays down as the compressor is turned on and turned off to control accumulator tank pressure. These pressure variations also have to be overcome by compressing the gas to a higher pressure than would otherwise be needed (wasting power) and by the use of an accumulator tank and a fast acting mass flow control valve having a very high gain servosystem.

The accumulator tank is large, heavy, and of at least medium cost.

The mass flow control valve is expensive, complicated, prone to calibration drift, prone to sealing problems, prone to particle contamination, prone to friction induced hysterisis problems for some versions, adversely affected by electrical noise emanating from the turbogenerator (due to its high servosystenm gains), and is of questionable reliability.

Compressing the natural gas to a pressure far above that needed by the turbogenerator in order to have enough pressure differential across the mass flow control valve for the valve to operate well is very wasteful of natural gas compression power.

To avoid the aforementioned shortcomings of most conventional gaseous fuel compression and control systems, it is necessary to use a rotary compressor that is not oil lubricated, does not have rubbing shaft seals, and does not have sliding surfaces. Centrifugal compressors do meet these requirements. However, centrifugal compressors operate best (with high efficiencies) when they have a high throughput flow rate and a low pressure rise relative to their tip speed. These operating conditions are characterized as high specific-speed conditions. Under these conditions, a centrifugal compressor can operate with an efficiency on the order of seventy-eight percent (78%). But the flow rate and pressure rise requirements for the compressor in the gaseous fuel compression and control system are for a low specific-speed compressor (low throughput flow rate and high pressure rise relative to the compressor's tip speed). A centrifugal compressor operating under these conditions would have an efficiency of less than twenty percent (20%). Under these conditions it would require a very large number of centrifugal compressors in series (e.g. ten (10)) to produce the same pressure rise for a given tip speed as could one (1) helical flow compressor. A helical flow compressor is an attractive candidate for this application. A helical flow turbine can perform the function of the mass flow control valve while additionally generating electrical power when the natural gas line pressure is greater than that needed by the turbogenerator. If a helical flow machine is used that can function as both a compressor and a turbine, the natural gas need only be compressed to forty (40) psig instead of to one hundred (100) psig, thereby saving power.

A helical flow compressor/turbine operating as a compressor is a high-speed rotating machine that accomplishes compression by imparting a velocity head to each fluid particle as it passes through the machine's impeller blades and then converting that velocity head into a pressure head in a stator channel that functions as a vaneless diffuser. While in this respect a helical flow compressor has some characteristics in common with a centrifugal compressor, the primary flow in a helical flow compressor is peripheral and asymmetrical, while in a centrifugal compressor, the primary flow is radial and symmetrical. The fluid particles passing through a helical flow compressor travel around the periphery of the helical flow compressor impeller within a generally horseshoe shaped stator channel. Within this channel, the fluid particles travel along helical streamlines, the centerline of the helix coinciding with the center of the curved stator channel. This flow pattern causes each fluid particle to pass through the impeller blades or buckets many times while the fluid particles are traveling through the helical flow compressor, each time acquiring kinetic energy. After each pass through the impeller blades, the fluid particles reenter the adjacent stator channel where they convert their kinetic energy into potential energy and a resulting peripheral pressure gradient in the stator channel. The multiple passes through the impeller blades (regenerative flow pattern) allows a helical flow compressor to produce discharge heads of up to fifteen (15) times those produced by a centrifugal compressor operating at equal tip speeds. A helical flow compressor operating at low specific-speed and at its best flow can have efficiencies of about fifty-five percent (55%) with curved blades and can have efficiencies of about thirty-eight percent (38%) with straight radial blades.

A helical flow compressor can be utilized as a turbine by supplying it with a high pressure working fluid, dropping fluid pressure through the machine, and extracting the resulting shaft horsepower with a generatorn Hence the term "compressor/turbine" which is used throughout this application.

Among the advantages of a helical flow compressor or a helical flow turbine are:

(a) simple, reliable design with only one rotating assembly;

(b) stable, surge-free operation over a wide range of operating conditions (i.e. from full flow to no flow);

(c) long life (e.g., 40,000 hours) limited mainly by their bearings;

(d) freedom from wear product and oil contamination since there are no rubbing or lubricated surfaces utilized;

(e) fewer stages required when compared to a centrifugal compressor; and (f) higher operating efficiencies when compared to a very low specific-speed (high head pressure, low impeller speed, low flow) centrifugal compressor.

The flow in a helical flow compressor can be visualized as two fluid streams which first merge and then divide as they pass through the compressor. One fluid stream travels within the impeller buckets and endlessly circles the compressor. The second fluid stream enters the compressor radially through the inlet port and then moves into the horseshoe shaped stator channel which is adjacent to the impeller buckets. Here the fluids in the two streams merge and mix. The stator channel and impeller bucket streams continue to exchange fluid while the stator channel fluid stream is drawn around the compressor by the impeller motion. When the stator channel fluid stream has traveled around most of the compressor periphery, its further circular travel is blocked by the stripper plate. The stator channel fluid stream then turns radially outward and exits from the compressor through the discharge port. The remaining impeller bucket fluid stream passes through the stripper plate within the buckets and merges with the fluid just entering the compressor/turbine.

The fluid in the impeller buckets of a helical flow compressor travels around the compressor at a peripheral velocity which is essentially equal to the impeller blade velocity. It thus experiences a strong centrifugal force which tends to drive it radially outward, out of the buckets. The fluid in the adjacent stator channel travels at an average peripheral velocity of between five (5) and ninety-nine (99) percent of the impeller blade velocity, depending upon the compressor discharge flow. It thus experiences an inertial force which is much less than that experienced by the fluid in the impeller buckets. Since these two inertial forces oppose each other and are unequal, the fluid occupying the impeller buckets and the stator channel is driven into a circulating or regenerative flow. The fluid in the impeller buckets is driven radially outward and "upward" into the stator channel. The fluid in the stator channel is displaced and forced radially inward and "downward" into the impeller bucket.

The fluid in the impeller buckets of a helical flow turbine travels around the turbine at a peripheral velocity which is essentially equal to the impeller blade velocity. It thus experiences a strong centrifugal force which would like to drive it radially outward if unopposed by other forces. The fluid in the adjacent stator channel travels at an average peripheral velocity of between one hundred and one percent (101%) and two hundred percent (200%) of the impeller blade velocity, depending upon the compressor discharge flow. It thus experiences a centrifugal force which is much greater than that experienced by the fluid in the impeller buckets. Since these two inertial forces oppose each other and are unequal, the fluid occupying the impeller buckets and the stator channel is driven into a circulating or regenerative flow. The fluid in the impeller buckets is driven radially inward and "upward" into the stator channel. The fluid in the stator channel is displaced and forced radially outward and "downward" into the impeller bucket.

While the fluid in either a helical flow compressor or helical flow turbine is traveling regeneratively, it is also traveling peripherally around the stator-impeller channel. Thus, each fluid particle passing through a helical flow compressor travels along a helical streamline, the centerline of the helix coinciding with the center of the generally horseshoe shaped stator-impeller channel.

SUMMARY OF THE INVENTION

In the present invention, the gaseous fuel compression and control system and method utilizes a helical flow compressor/turbine integrated with a permanent magnet motor/generator and driven by a torque controlling inverter to compress or expand gaseous fuels, to precisely control fuel pressure and fuel flow delivered to a turbogenerator, and to precisely control the speed, the combustion or turbine exhaust temperature and the electrical power output of the turbogenerator.

The gaseous fuel compression and control system can be comprised of (in order of inline connection and gas flow): 1) a connection to a natural gas pipe line, 2) a solenoid actuated inlet shut-off valve, 3) an optional low pressure helical flow compressor/turbine permanent magnet motor/generator module (used if the natural gas pipeline pressure is very low), 4) a high pressure helical flow compressor/turbine permanent magnet motor/generator module, 5) a discharge pressure sensor, 6) a solenoid actuated outlet shut-offvalve, 7) a connection to the turbogenerator's combustor nozzle manifold, and 8) a computer control system that sets the turbogenerator's inverter and motor/generator speed, monitors the turbogenerator's power output and turbine discharge temperatures, sets the helical flow compressor/turbine shaft torque, and monitors the helical flow compressor/turbine shaft speed.

The method of gaseous fuel compression and control includes establishing the turbogenerator speed required based upon the power load requirements of the turbogenerator, establishing the turbogenerator combustion or turbine exhaust temperature required based upon the power load requirements of the turbogenerator, establishing the gaseous fuel pressure requirements to produce the established turbogenerator speed and temperature, and commanding the helical flow compressor/turbine to produce the established gaseous fuel pressure by controlling the torque or the speed of the helical flow compressor/turbine permanent magnet motor/generator.

The gaseous fuel compression and control system for a turbogenerator includes a helical flow compressor/turbine for supplying pressurized gaseous fuel to the gaseous fuel nozzles of the turbogenerator combustor with the turbogenerator compressor supplying compressed air to the turbogenerator combustor. A motor, such as a permanent magnet motor, drives the helical flow compressor/turbine. A helical flow compressor/turbine motor inverter drive provides electrical power to the motor and receives operational phase and speed data from the motor. The inverter drive also receives maximum speed and command torque control signals from the turbogenerator power controller which receives a speed feedback signal from the helical flow compressor/turbine motor inverter drive. A turbogenerator speed signal and a turbine exhaust gas temperature signal are provided to the turbogenerator power controller from the turbogenerator.

The helical flow compressor/turbine system is typically thirty (30) to forty (40) times smaller than systems with reciprocating compressors; consumes about one-third (⅓) of the energy than other gaseous fuel compression systems use; does not require the use of an accumulator; does not compress the gaseous fuel to a pressure that is higher than is needed by the turbogenerator and then throw the extra pressure away through regulation; does not cycle on and off; does not operate in a pulsed mode; and is very fast and responsive having low inertia impeller wheels and being controlled by the same computer that controls the entire turbogenerator combustion process.

The helical flow compressor/turbine, typically having multiple compression stages, is driven at high speed on the order of thirty six thousand (36,000) rpm by a permanent magnet motor generator. It is designed to produce very high pressure for a given impeller tip speed. A conventional centrifugal compressor passes gaseous fuel such as natural gas through its impeller blade to impart kinetic energy to the gaseous fuel. That kinetic energy or velocity energy is then converted to pressure energy in a diffuser channel. This happens only once as the gaseous fuel goes through the compressor. In order to obtain a large pressure rise, you either have to have an extremely high speed impeller with a very large diameter, or you have to have a large number of compression stages (on the order of forty (40)).

A helical flow compressor/turbine also takes inlet gaseous fuel into its impeller blades where it picks up kinetic energy or velocity energy and then the gaseous fuel goes into a stator channel (which is in effect a vaneless diffuser) where the kinetic energy is converted into pressure energy. While this happens only once in the typical centrifugal compressor, it typically happens twelve (12) to fifteen (15) times in a helical flow compressor/turbine. Thus, you can obtain about twelve (12) to fifteen (15) times as much pressure rise in a single stage of a helical flow compressor/turbine as you can obtain in a single stage of a centrifugal compressor.

The helical flow compressor/turbine is also designed to produce very low flows whereas the centrifugal compressor requires higher flows for greater efficiency. Because of this, centrifugal compressors operating at high flows have higher efficiencies than helical flow compressor/turbines running at their best efficiencies. When, however, you compare centrifugal compressors with helical flow compressor/turbines with the same low flows, helical flow compressor/turbines actually have higher efficiencies. A centrifugal compressor operating at its best operating condition would be operating at about a seventy eight percent (78%) efficiency. The centrifugal compressor would, however, be operating at its best flow which will be well above the flows needed by the turbogenerator. The helical flow compressor/turbine operating at its best flow can have efficiencies with curved blades of about fifty five percent (55%) and with straight blades of about thirty eight percent (38%). The efficiency of the helical flow compressor/turbine with straight blades for the flows required by the turbogenerator is about twenty five percent (25%) and with curved blades may be slightly over thirty percent (30%). On the other hand, the centrifugal compressor efficiency under similar conditions would be under twenty percent (20%) because it would be operating at such a low flow, well below where it is designed to operate at. At these low flows, there is a lot of scroll leakage losses in the centrifugal compressor.

The helical flow compressor/turbine has a lightweight wheel or impeller for a given throughput flow rate and pressure rise. The centrifugal compressor will be somewhat heavier with less ability to accelerate and decelerate than the helical flow compressor/turbine. If both a centrifugal compressor and a helical flow compressor/turbine were designed to provide what the turbogenerator requires, the impeller of the helical flow compressor/turbine would be much lighter and much easier to accelerate and decelerate than the impeller of the centrifugal compressor and the centrifugal compressor system would have many more stages.

Since the pressure of the gaseous fuel introduced into the turbogenerator combustor is a function of the helical flow compressor/turbine shaft torque and shaft speed, the fuel control system computer can control the inverter which controls the motor which controls the compressor and effectively allows the computer to control either the pressure or the flow of the helical flow compressor/turbine which is compressing gaseous fuel. In a helical flow compressor/turbine driven by a permanent magnet motor, or by an induction motor, you can control the torque the motor produces or control the motor speed or a mix of the two. Typically in this application, the torque is controlled since that controls the pressure rise of the compressor. Since the buckets have a known cross sectional area at a known radius to the center of the compressor/turbine motor shaft, there is a known pressure rise for a given motor torque. The gaseous fuel to the turbogenerator can therefore be effectively controlled.

The turbogenerator should be able to operate on whatever gaseous fuel you have available in a pipeline, anywhere from six (6) inches water gauge at the low end to about fifty (50) psi gauge pressure at the top end. If your initial gas pressure is too high, the helical flow compressor/turbine can be operated in a reverse direction to function as a turbine and reduce the pressure coming into the turbogenerator so that you get the amount of fuel you need for initial ignition. After ignition, combustion produces heat and combustion gas flow that drives the turbine and accelerates the turbogenerator which raises the pressure of the turbogenerator compressor. As the turbogenerator compressor increases the pressure of the combustion air, you will also need to increase the gaseous fuel pressure to keep it somewhat higher so that there is a positive flow of gaseous fuel to the combustor nozzles. If for any reason the turbogenerator gets to a speed so as to produce more turbogenerator compressor discharge pressure than the gaseous fuel pressure, the gaseous fuel flow will stop and no gaseous fuel will enter the turbogenerator combustor and the turbogenerator goes down in speed. This in fact constitutes a speed control mechanism which works extremely well.

A conventional gaseous fuel compression and control system controls the fuel mass flow rate delivered to the turbogenerator but not the pressure of the fuel delivered to the turbogenerator. If the flow is held constant, the turbogenerator speed can run away when the electric power load suddenly drops off. If the electrical load coming out of the turbogenerator drops off, more torque is available from the turbine to accelerate the wheel. The problem is controlling the speed in the system based upon controlling the mass flow of gaseous fuel. Only a high speed, high gain servosystem can prevent speed surges if fuel flow is controlled rather that fuel pressure.

In the present invention, the pressure rather than the mass flow of the gaseous fuel is controlled and set to a pressure such as twenty five (25) psi gauge. The turbogenerator will automatically accelerate if the compressor discharge pressure is less than twenty three and one-half (23½) psi gauge. At that point, the turbogenerator is getting the amount of fuel it needs to run. With a drop off of load at the turbogenerator, the most that the turbogernerator speed can increase is that change in speed associated with an increase of one and one-half (½) psi in compressor discharge pressure. The speed goes up about three percent (3%) or four percent (4%) (considered to be a speed error) and stabilizes out as the gaseous fuel flow naturally drops down. Essentially what the computer based control logic does is reduce this small error by using a limited amount of gain or by using limited authority integration reducing this small error to essentially zero with small variations in fuel pressure. This makes a stable servo control.

With prior art technology, there is almost no gain in the turbogenerator by virtue of the fuel pneumatics and the compressed air pneumatics, the gain is all in the computer that is controlling the gaseous filel and that's a hard thing to do. What is done in the present invention is to use the turbogenerator as a moderate gain servosystem on its own right. If you control the fuel pressure, you control the turbogenerator speed within a five percent (5%) tolerance range for a wide range of output power. The turbogenerator keeps itself from overspeeding and enables the system to get by with a very low gain (thus stable) servosystem that is computer based. Noting the power that the customer wants electrically, the computer goes to look-up tables to determine the speed and temperature at which the turbogenerator should be operating to produce that power. Another look-up table determines what pressure the gaseous fuel should have to be consistent with that selected turbogenerator speed and temperature. The fuel pressure is then commanded to be equal to that level by changing the speed of the helical flow compressor/turbine or by changing the torque of the helical flow compressor/turbine motor. These conditions are obtained with a very small error because the prediction algorithms can be extremely accurate. A very small authority or limited gain integral proportional controller algorithm can trim out the last errors in speed, exhaust gas temperature, or output power.

A gaseous fuel compression and control system based on the present invention stabilizes much faster than systems with reciprocating compressors and mass flow control valves. It has been demonstrated that this system can control a turbogenerator over a speed range of twenty four thousand (24,000) rpm to ninety six thousand (96,000) rpm and can control the turbogenerator speed to within ten (10) rpm and that it can also control the turbine exhaust temperature to within two (2) degrees Fahrenheit. It is a very friendly system which does not overshoot and is capable of overcoming many of the difficulties of prior systems.

It is therefore the principle objective of the present invention to provide an improved gaseous fuel compression and control system and method for a turbogenerator.

It is another object of the present invention to provide a gaseous fuel compression and control system having means to compress gaseous fuel from natural gas line pressure to the pressure required by the turbogenerator combustor.

It is another objective of the present invention to provide a gaseous fuel compression and control system that utilizes a helical flow compressor to compress and raise the pressure of the gaseous fuel.

It is another objective of the present invention to provide a gaseous fuel compression and control system that utilizes a helical flow turbine to expand and reduce the pressure of the gaseous fuel.

It is another objective of the present invention to provide a gaseous fuel compression and control system that utilizes a helical flow compressor/turbine that can both compress (raise the pressure) and expand (lower the pressure) of the gaseous fuel.

It is another objective of the present invention to provide a gaseous fuel compression and control system that utilizes a helical flow compressor/turbine integrated with a permanent magnet motor/generator and an inverter that can utilize electrical energy to compress the gaseous fuel when the gaseous fuel supply pressure is less than that needed by the turbogenerator.

It is another objective of the present invention to provide a gaseous fuel compression and control system that utilizes a helical flow compressor/turbine integrated with a permanent magnet motor/generator and a four quadrant inverter that can generate electrical power when the gaseous fuel supply pressure is greater than that needed by the turbogenerator.

It is another objective of the present invention to provide a gaseous fuel compression and control system that utilizes a helical flow compressor/turbine permanent magnet motor/generator that can shift or transition smoothly from generating electrical power while expanding or reducing the pressure of the gaseous fuel to utilizing electrical power to compress or increase the pressure of the gaseous fuel in response to changes in the natural gas line pressure or changes in the fuel pressure and/or fuel flow required by the turbogenerator.

It is another objective of the present invention to provide a gaseous fuel compression and control system that utilizes a helical flow compressor/turbine permanent magnet motor/generator and associated inverter that can precisely control the shaft torque of the helical flow compressor/turbine permanent magnet motor/generator.

It is another objective of the present invention to provide a gaseous fuel compression and control system that utilizes a helical flow compressor/turbine permanent magnet motor/generator and associated inverter that can precisely monitor the shaft speed of the helical flow compressor/turbine permanent magnet motor/generator.

It is another objective of the present invention to provide a gaseous fuel compression and control system that utilizes a helical flow compressor/turbine permanent magnet motor/generator and associated inverter that can precisely control and/or monitor both the shaft torque and the shaft speed of the helical flow compressor/turbine permanent magnet motor/generator.

It is another objective of the present invention to provide a gaseous fuel compression and control system that utilizes a helical flow compressor/turbine integrated with a permanent magnet motor/generator and a torque controlling inverter that can inherently control the change in gas pressure across the compressor/turbine (since pressure change is nominally proportional to torque).

It is another objective of the present invention to provide a gaseous fuel compression and control system that utilizes a helical flow compressor/turbine integrated with a permanent magnet motor/generator and a torque controlling inverter with speed output data that can inherently control and/or monitor and/or provide data to compute the change in gas energy as the gaseous fuel passes through the helical flow compressor/turbine (since gas energy change is related to the product of shaft speed times shaft torque).

It is another objective of the present invention to provide a gaseous fuel compression and control system that utilizes a helical flow compressor/turbine integrated with a permanent magnet motor/generator and a torque controlling inverter with speed output data that can provide information to compute gaseous fuel flow rate.

It is another objective of the present invention to provide a gaseous fuel compression and control system that utilizes a compressor/turbine that is not susceptible to fluid dynamic instabilities such as stall or surge (such as are experienced by centrifugal compressors when flows are low, speeds are low and pressure changes across the compressor are large) or to any other pressure or flow discontinuities in the pressure/flow profile.

It is another objective of the present invention to provide a gaseous fuel compression and control system that utilizes a rotary compressor/turbine that produces a large pressure change with low rotor tip speed.

It is another objective of the present invention to provide a gaseous fuel compression and control system that utilizes a rotary compressor/turbine that can quickly and continuously adjust its gaseous filel discharge flow rate to match changing pipeline or turbogenerator conditions, This requires low inertia impeller wheel(s).

It is another objective of the present invention to provide a gaseous fuel compression and control system that utilizes a rotary compressor/turbine that operates with reasonable efficiency when its specific-speed is low (i.e. when pressure change is high, tip speed is low and flow rate is low).

It is another objective of the present invention to provide a gaseous fuel compression and control system that utilizes a motor/generator that is efficient.

It is another objective of the present invention to provide a gaseous fuel compression and control system that utilizes a helical flow compressor/turbine that can be configured as a single stage, a two stage, or a three stage rotary machine.

It is another objective of the present invention to provide a gaseous filel compression and control system that does not utilize a flow control valve downstream of the gaseous fuel compressor.

It is another objective of the present invention to provide a gaseous fuel compression and control system that does not compress the gaseous filel to a pressure substantially above the pressure required by the turbogenerator since such high pressure compression would waste gas compression energy.

It is another objective of the present invention to provide a gaseous fuel compression and control system that compresses the gaseous fuel only to the pressure required by the turbogenerator (thus saving energy).

It is another objective of the present invention to provide a gaseous fuel compression and control system that has no gas storage but compresses the gaseous fuel only when it is needed.

It is another objective of the present invention to provide a gaseous fuel compression and control system that does not require an accumulator tank.

It is another objective of the present invention to provide a gaseous fuel compression and control system that does not require the compressor to be turned on and off in order to control its discharge pressure when the natural gas pipeline pressure changes or the gas pressure flow required by the turbogenerator changes.

It is another objective of the present invention to provide a gaseous fuel compression and control system that does not utilize a compressor having pressure or flow pulsations in its discharge gas flow.

It is another objective of the present invention to provide a gaseous fuel compression and control system that does not utilize a compressor having pistons.

It is another objective of the present invention to provide a gaseous fuel compression and control system that does not utilize a compressor having rubbing or sliding surfaces.

It is another objective of the present invention to provide a gaseous fuel compression and control system that does not utilize a compressor having rotary shaft seals.

It is another objective of the present invention to provide a gaseous fuel compression and control system that does not utilize a compressor that can have oil droplets or oil vapor entrained in its discharge gas flow.

It is another objective of the present invention to provide a gaseous fuel compression and control system that does not utilize a compressor having oil lubrication.

BRIEF DESCRIPTION OF THE DRAWINGS

Figure 1:
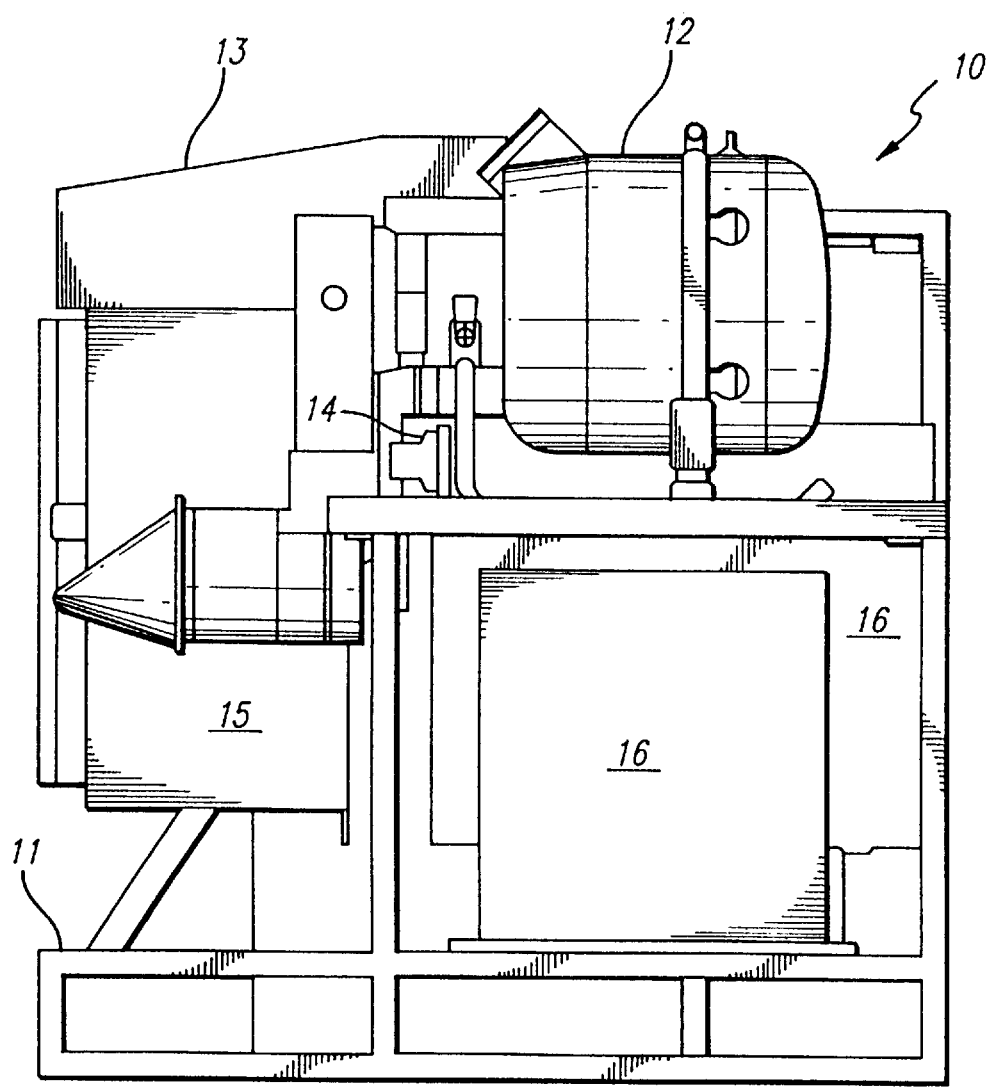
Figure 2:
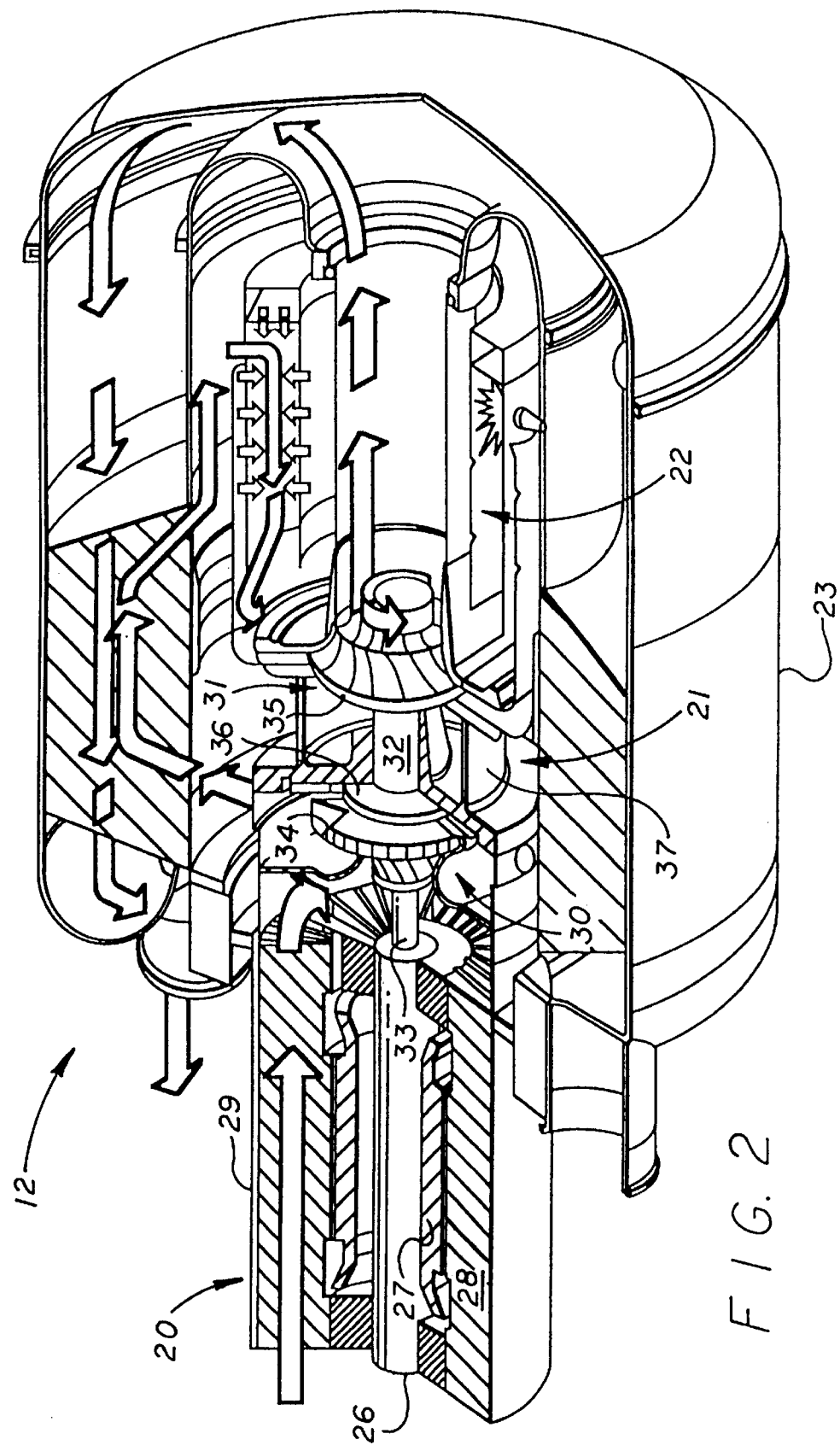
Figure 3:
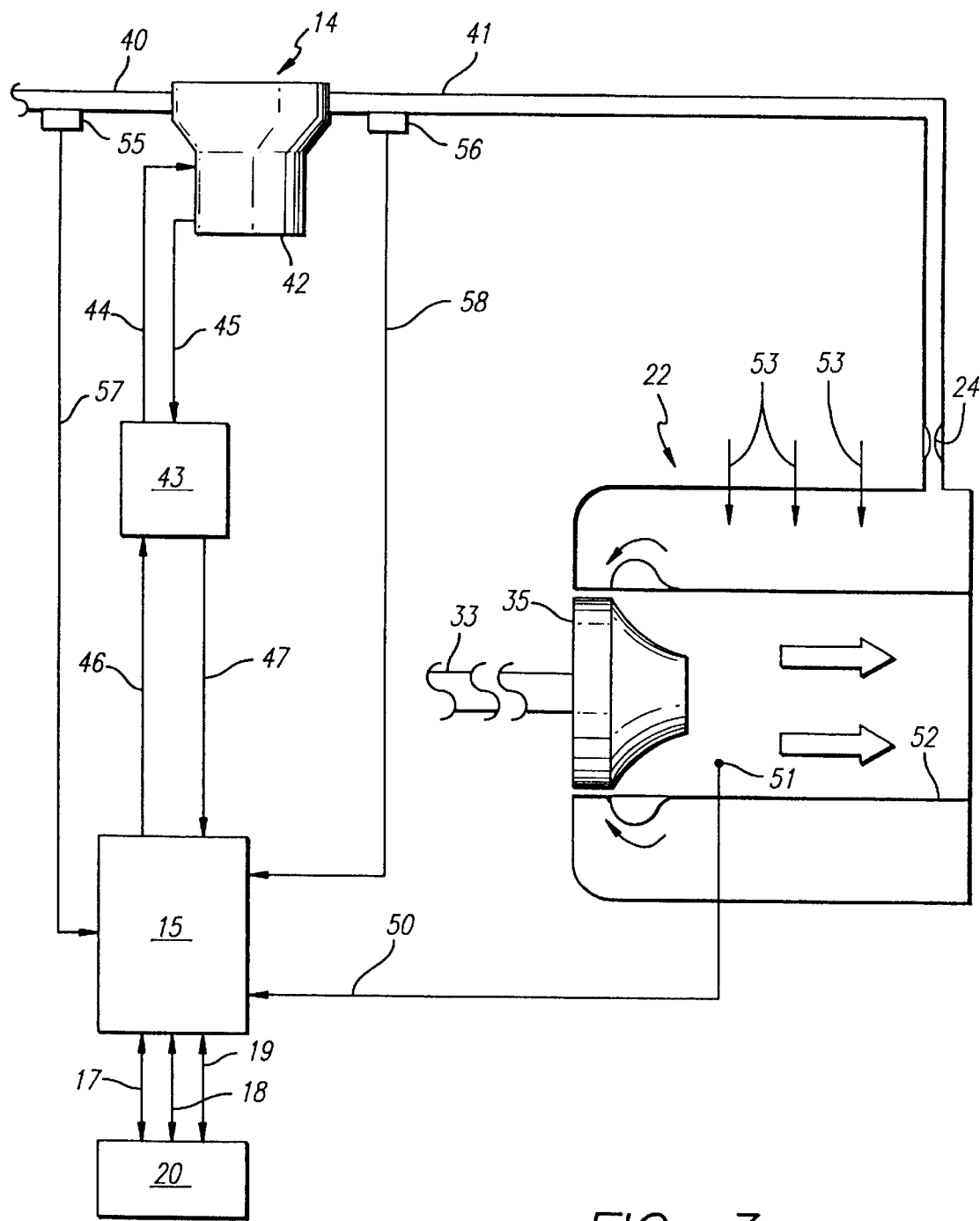
Figure 4:
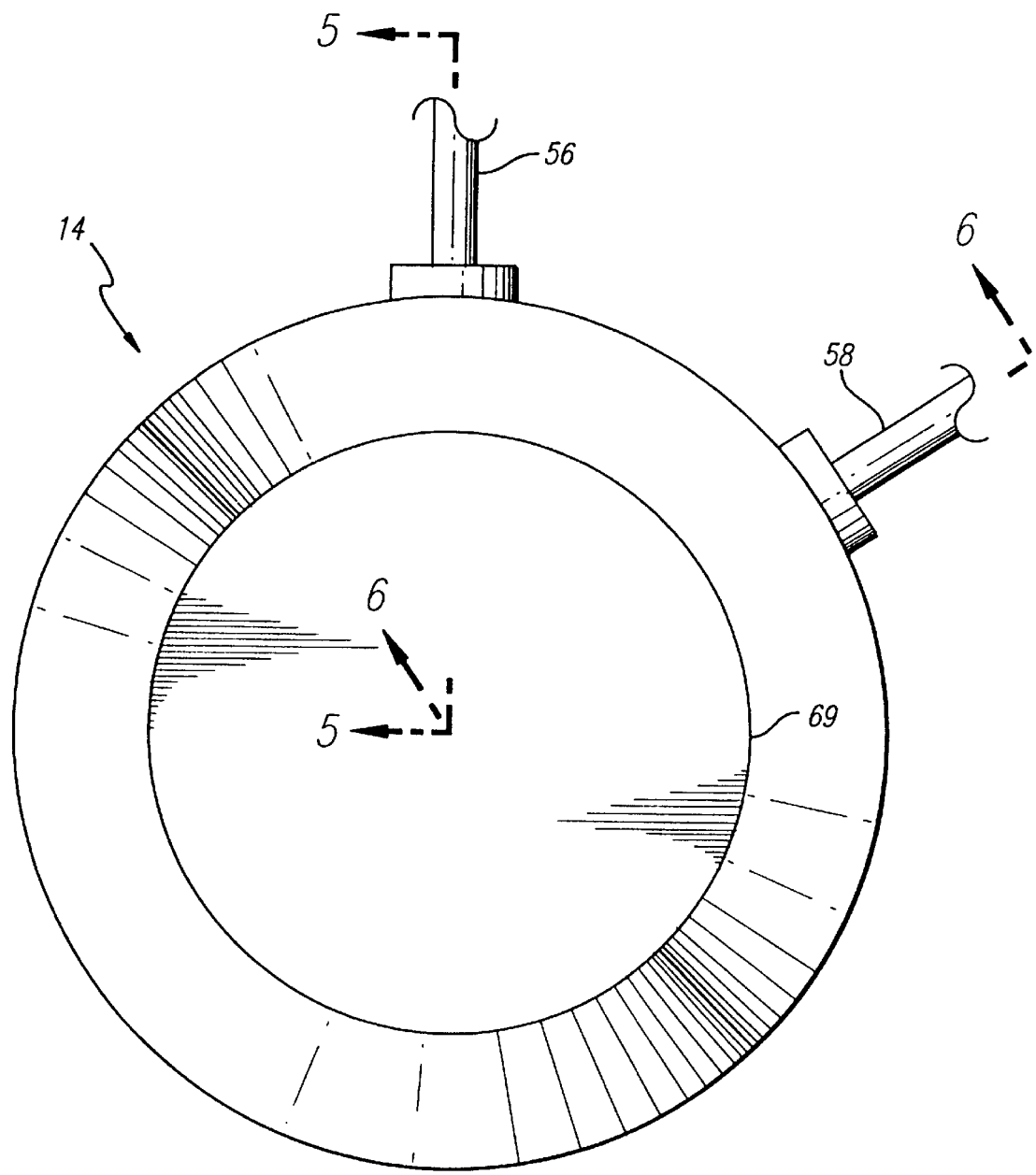
Figure 5:
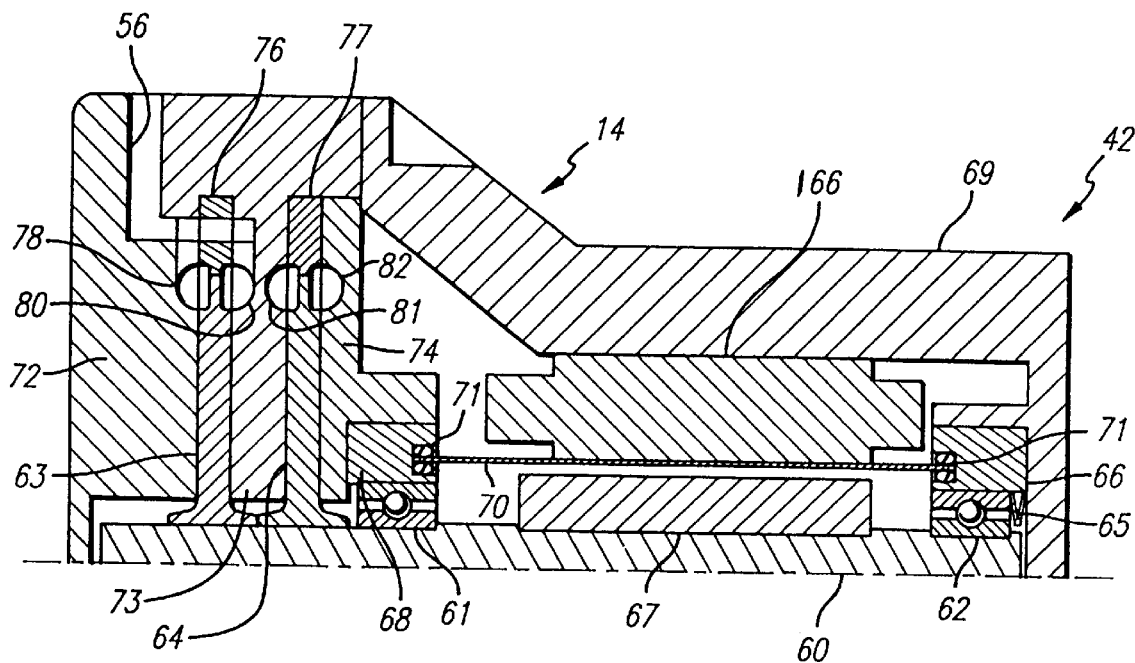
Figure 6:
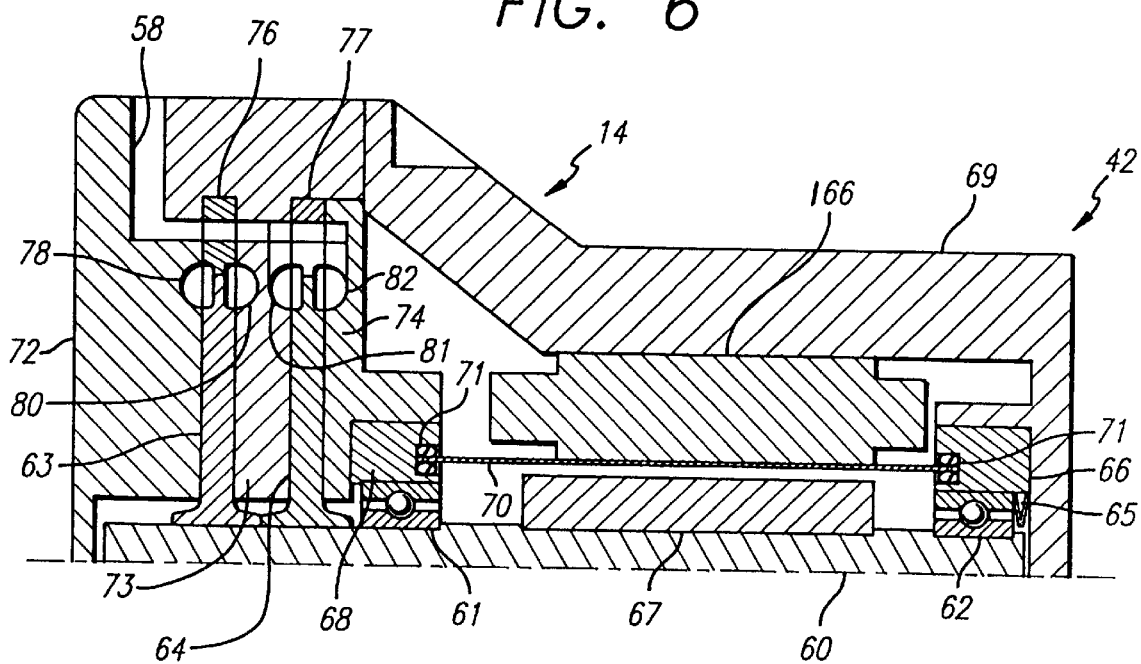
Figure 7:
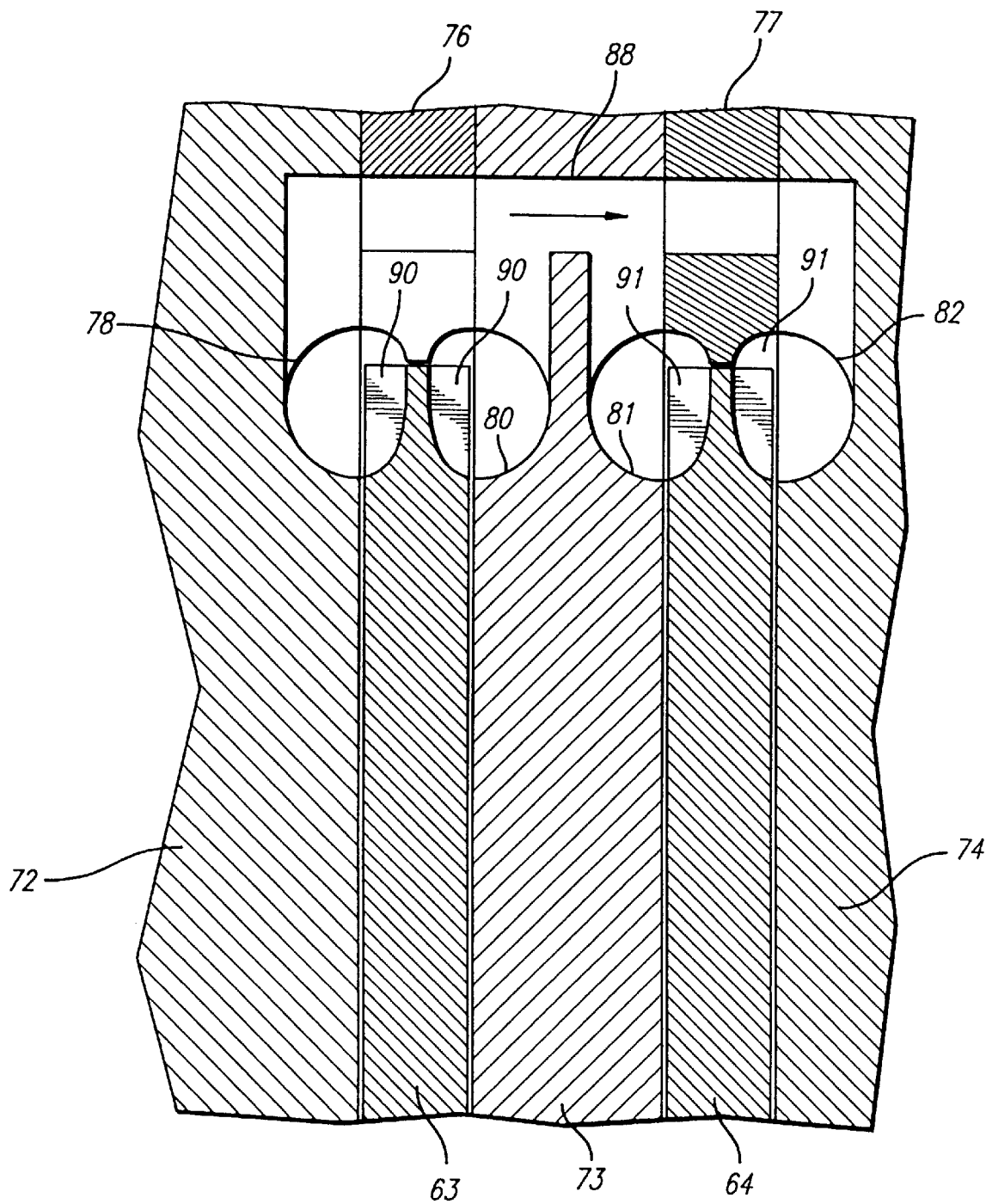
Figure 8:
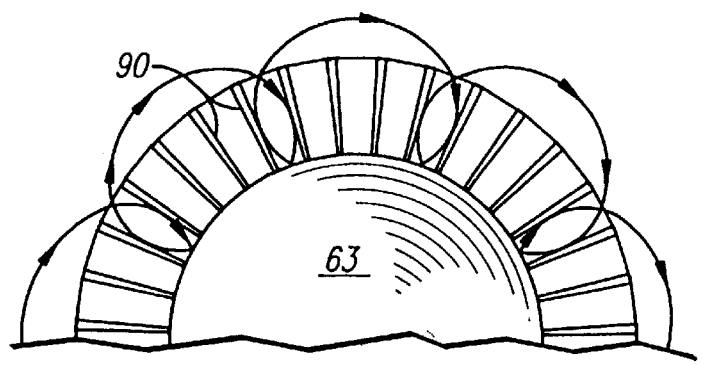
Figure 9:
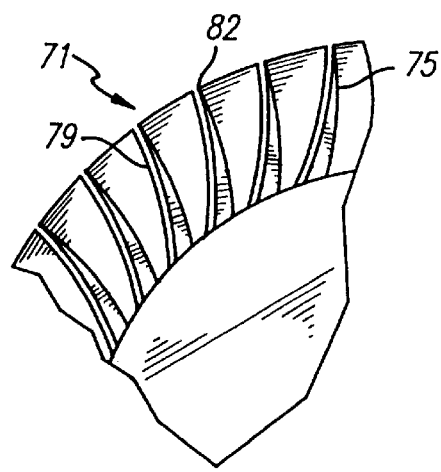
Figure 10:
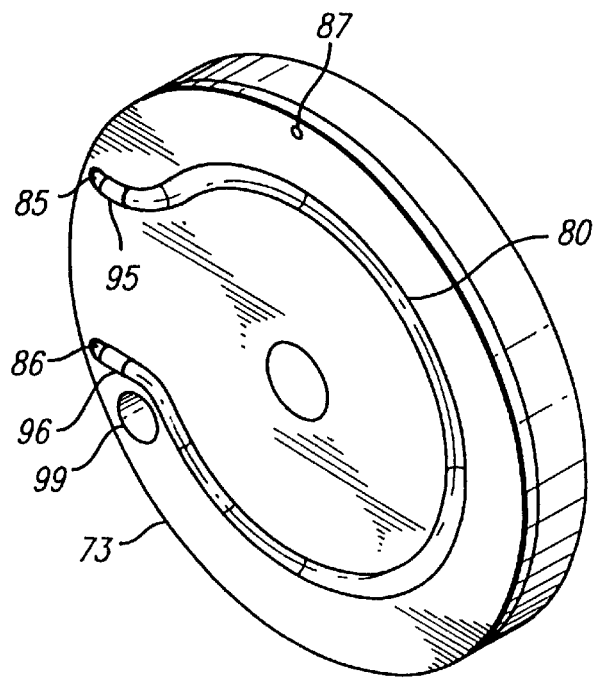
Figure 11:
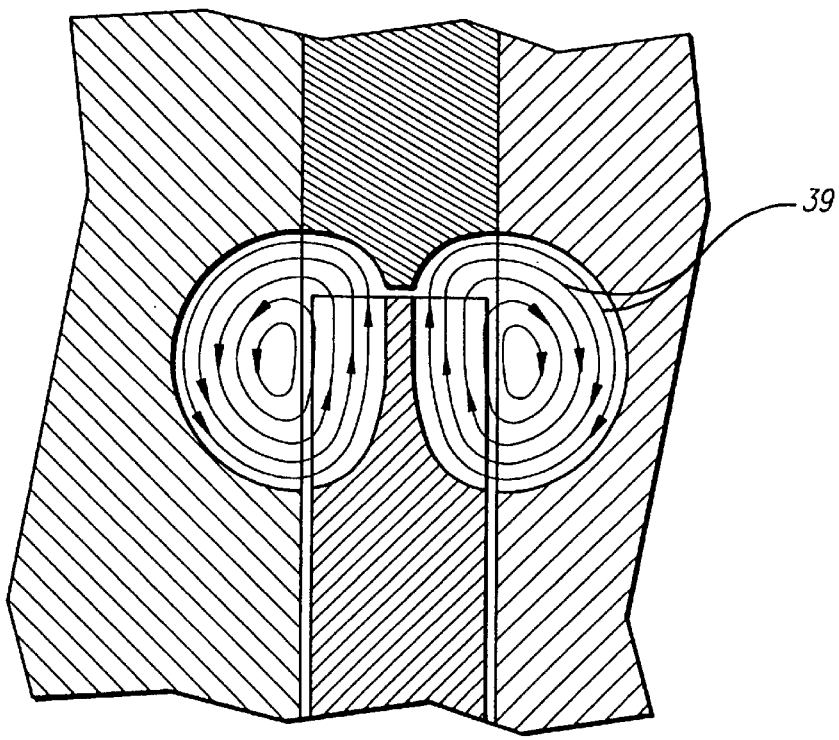
Figure 12:
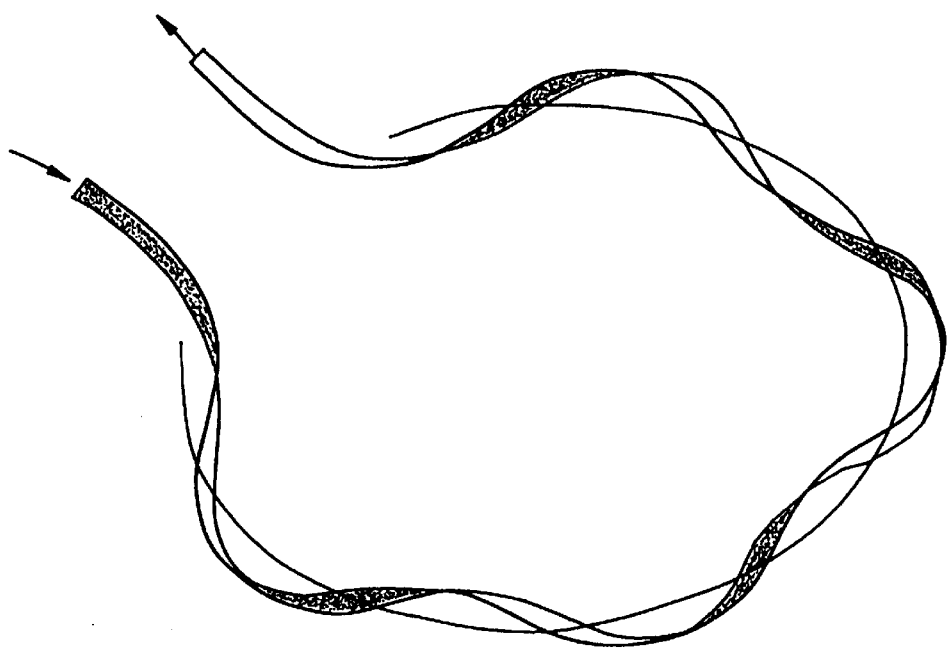
Figure 13:
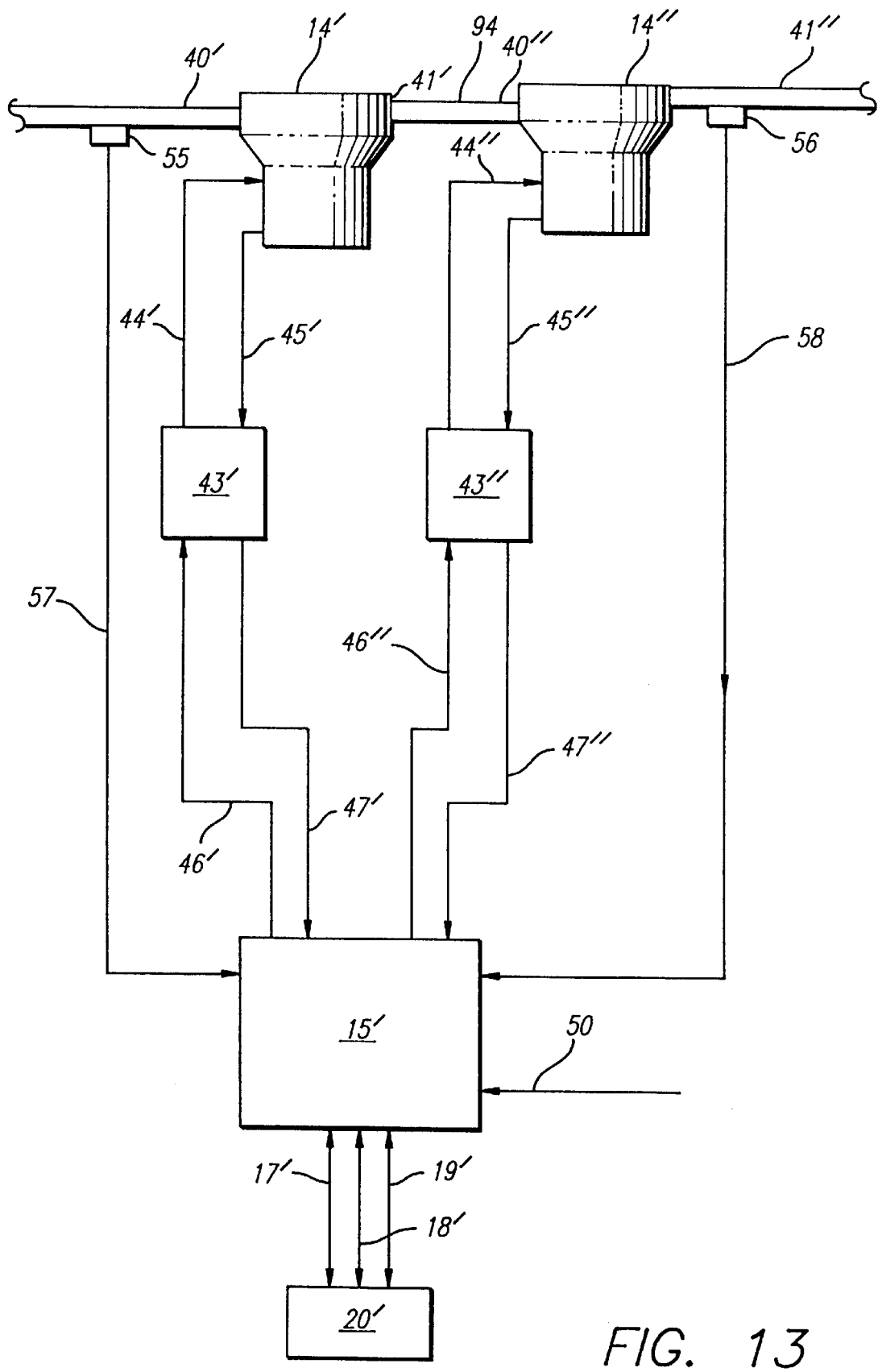
Figure 14:
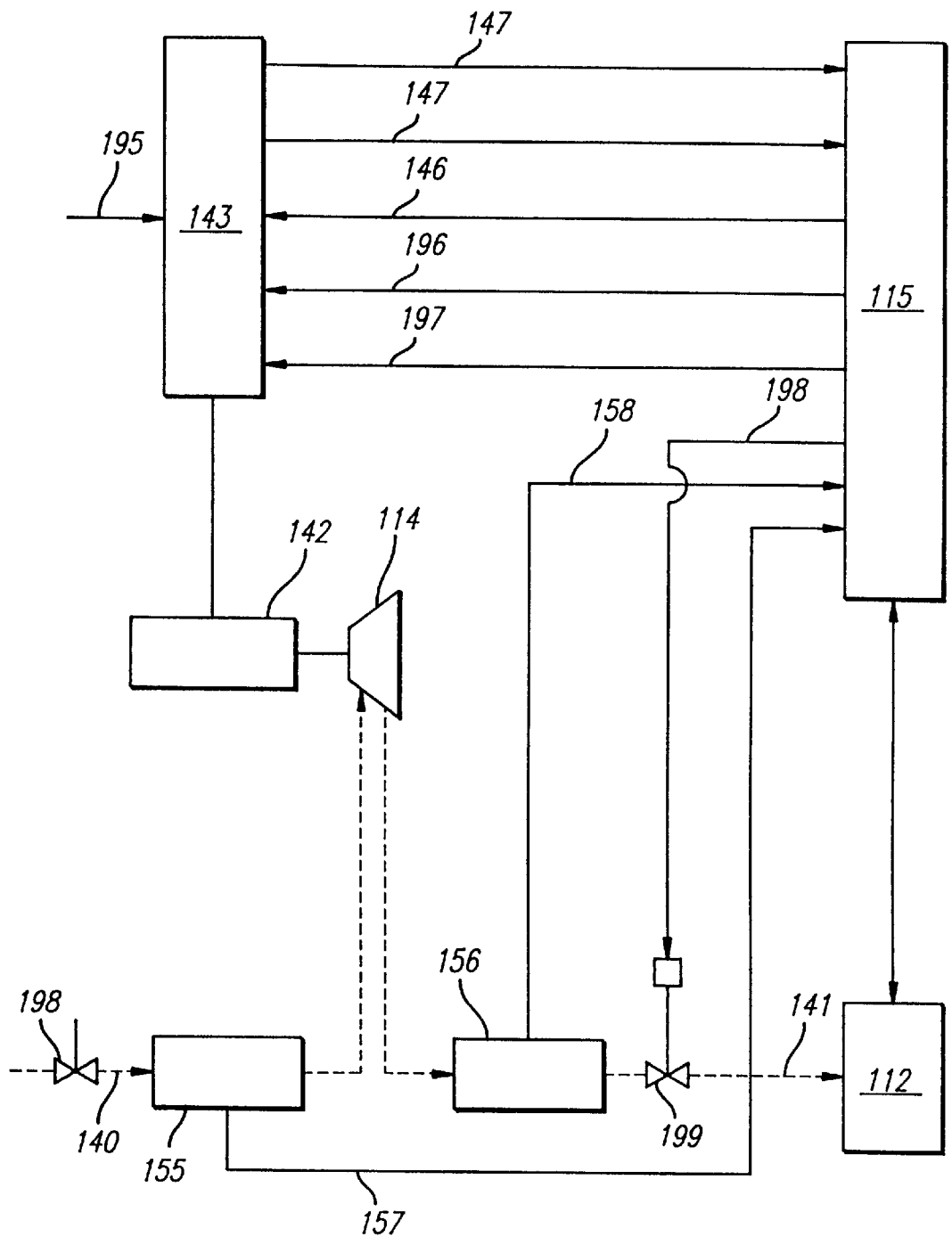
Figure 15:
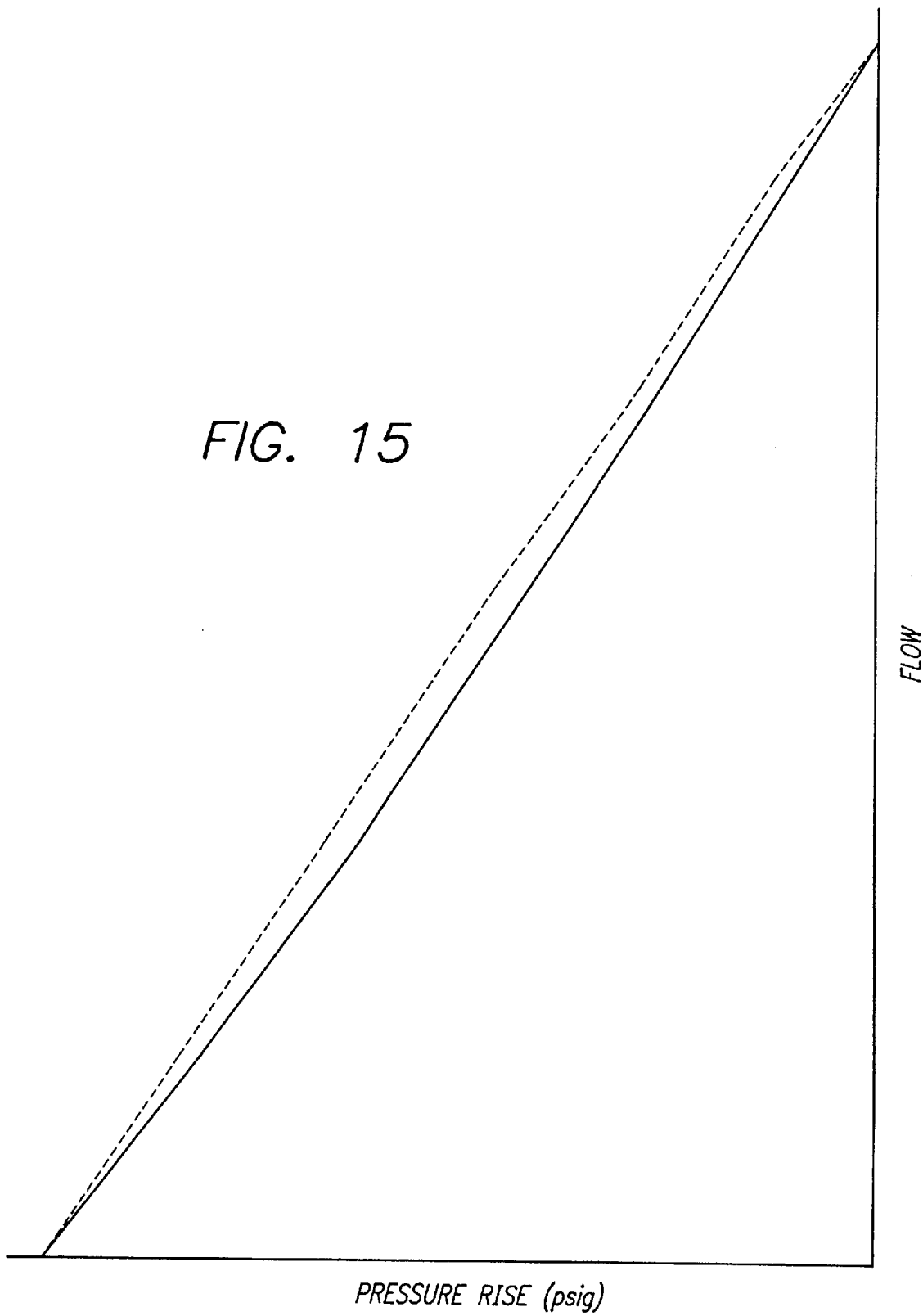

Having thus described the present invention in general terms, reference will now be made to the accompanying drawings in which:

FIG. 1 is a plan view of a turbogenerator set utilizing the gaseous fuel compression and control system and method of the present invention;

FIG. 2 is a perspective view, partially cut away, of a turbogenerator for the turbogenerator set of FIG. 1;

FIG. 3 is a block diagram, partially schematic, view of the gaseous fuel compression and control system and method of the present invention;

FIG. 4 is an end view of a two stage helical flow compressor/turbine permanent magnet motor/generator for use in the gaseous fuel compression and control system and method of the present invention;

FIG. 5 is a cross sectional view of the helical flow compressor/turbine permanent magnet motor/generator of FIG. 4 taken along line 5—5;

FIG. 6 is a cross sectional view of the helical flow compressor/turbine permanent magnet motor/generator of FIG. 4 taken along line 6—6;

FIG. 7 is an enlarged sectional view of the helical flow compressor/turbine permanent magnet motor/generator of FIG. 4 illustrating the crossover of gaseous fuel from the low pressure stage to the high pressure stage;

FIG. 8 is an enlarged partial plan view of the helical flow compressor/turbine impeller having straight radial blades and illustrating the flow of fluid therethrough;

FIG. 9 is an enlarged partial plan view of a helical flow compressor/turbine impeller having curved blades;

FIG. 10 is an exploded perspective view of a stator channel plate of the helical flow compressor/turbine permanent magnet motor/generator of FIG. 4;

FIG. 11 is an enlarged sectional view of a portion of FIG. 7 illustrating fluid flow streamlines in the impeller blades and helical flow stator channels;

FIG. 12 is a schematic representation of the flow of fluid through a helical flow compressor/turbine;

FIG. 13 is a block diagram, partially schematic, view of the gaseous fuel compression and control system and method of the present invention illustrating two (2) helical flow compressor/turbines in series;

FIG. 14 is an alternate schematic representation of the gaseous fuel compression and control system and method of the present invention; and FIG. 15 is a graph of the pressure versus flow characteristics of a helical flow compressor.

DETAILED DESCRIPTION OF THE PREFERRED EMBODIMENTS

A turbogenerator set 10 utilizing the gaseous fuel compression and control system and method of the present invention is illustrated in FIG. 1. A mounting platform 11 supports the turbogenerator 12, associated ducts 13, helical flow compressor/turbine permanent magnet motor/generator 14, turbogenerator set power controller 15, and line commutated inverter 16 (in two (2) enclosures).

The turbogenerator 12 is illustrated in detail in FIG. 2 and generally comprises a permanent magnet generator 20, a power head 21, a combustor 22 and a recuperator (or heat exchanger) 23.

The permanent magnet generator 20 includes a permanent magnet rotor or sleeve 26, having a permanent magnet disposed therein, rotatably supported within a permanent magnet stator 27 by a pair of spaced journal bearings. Radial permanent magnet stator cooling fins 28 are enclosed in an outer cylindrical sleeve 29 to form an annular air flow passage which cools the permanent magnet stator 27 and thereby preheats the air passing through on its way to the power head 21.

The power head 21 of the turbogenerator 12 includes compressor 30, turbine 31, and bearing rotor 32 through which the tie rod 33 to the permanent magnet rotor 26 passes. The compressor 30, having compressor impeller or wheel 34 which receives preheated air from the annular air flow passage in cylindrical sleeve 29 around the permanent magnet stator 27, is driven by the turbine 31 having turbine wheel 35 which receives heated exhaust gases from the combustor 22 supplied with air from recuperator 23. The compressor wheel 34 and turbine wheel 35 are supported on a bearing shaft or rotor 32 having a radially extending bearing rotor thrust disk 36. The bearing rotor 32 is rotatably supported by a single journal bearing within the center bearing housing 37 while the bearing rotor thrust disk 36 at the compressor end of the bearing rotor 32 is rotatably supported by a bilateral thrust bearing.

Intake air is drawn through the permanent magnet generator 20 by the compressor 30 which increases the pressure of the air and forces it into the recuperator 23. In the recuperator 23, exhaust heat from the turbine 31 is used to preheat the air before it enters the combustor 22 where the preheated air is mixed with fuel and burned. The combustion gases are then expanded in the turbine 31 which drives the compressor 30 and the permanent magnet rotor 26 of the permanent magnet generator 20 which is mounted on the same shaft as the turbine 31. The expanded turbine exhaust gases are then passed through the recuperator 23 before being discharged from the turbogenerator 12.

As illustrated in FIG. 3, the helical flow compressor/ turbine 14, having motor 42, includes a gaseous fuel inlet 40 to provide a gaseous fuel such as natural gas to the helical flow compressor/turbine 14 at line pressure and a gaseous fuel outlet 41 to provide elevated pressure gaseous fuel to the combustor 22 via nozzles 24. While the helical flow compressor/turbine motor 42 can be an induction motor, it would preferably be a permanent magnet motor which could also function as a permanent magnet generator. A helical flow compressor/turbine motor inverter drive 43 provides three (3) phase electrical power to the helical flow compressor/turbine motor 42 via electrical connection 44 and receives operational speed and phase data from the helical flow compressor/turbine motor 42 via electrical connection 45.

The helical flow compressor/turbine motor inverter drive 43 receives torque control signals and maximum speed control signals 46 from the turbogenerator set power controller 15. The turbogenerator set power controller 15, which includes a central processing unit, receives helical flow compressor/turbine motor/generator speed and current (torque is proportional to current) feedback signal 47 from the helical flow compressor/turbine motor inverter drive 43. A turbogenerator turbine exhaust gas temperature signal 50 from thermocouple 51 in the turbogenerator turbine exhaust gas duct 52 is also provided to the turbogenerator set power controller 15.

The combustor 22 also includes a plurality of compressed air inlets 53 which provide pressurized air from the turbogenerator compressor 30 to the combustor 22. One or both of the gaseous fuel inlet 40 or gaseous fuel outlet 41 of the gaseous fuel helical flow compressor/turbine 14 may include a pressure sensor. Gaseous fuel inlet pressure sensor 55 and gaseous fuel outlet pressure sensor 56 can provide pressure data to the turbogenerator set power controller 15 via lines 57 and 58, respectively. While both a gaseous fuel inlet pressure sensor 55 and a gaseous fuel outlet pressure sensor 56 are illustrated, only one may be required since if one pressure value is sensed, the other pressure value can be accurately calculated. Further, the gaseous fuel helical flow compressor/turbine 14 of the present invention is completely functional with or without pressure sensors in either or both of the gaseous fuel inlet 40 or the gaseous fuel outlet 41.

The turbogenerator permanent magnet generator 20 exchanges three phase data with the turbogenerator set power controller 15 via lines 17, 18, and 19. Included in this data would be turbogenerator speed data.

The helical flow compressor/turbine permanent magnet motor/generator 14 is illustrated in detail in FIGS. 4–11. While it is shown in a two (2) compression stage configuration) it should be recognized that the helical flow compressor/turbine 14 may have a single compression stage or as many as three (3) compression stages. The helical flow compressor/turbine permanent magnet motor/generator is described in additional detail in a U.S. patent application Ser. No. 08/730,946, filed Oct. 16, 1996 by Robert W. Bosley, Ronald F. Miller, and Joel B. Wacknov entitled "Helical Flow Compressor/Turbine Permanent Magnet Motor/Generator", assigned to the same assignee as this application, and is herein incorporated by reference.

A two (2) stage helical flow compressor/turbine permanent magnet motor/generator is illustrated in FIGS. 4–6 and includes a fluid inlet 56 to provide fluid to the helical flow compressor/turbine of the helical flow compressor/turbine permanent magnet motor/generator and a fluid outlet 58 to remove fluid from the helical flow compressor/turbine of the helical flow compressor/turbine permanent motor/generator.

The helical flow compressor/turbine permanent magnet motor/generator includes a shaft 60 rotatably supported by bearings 61 and 62. The position of bearing 62 is maintained by two (2) back-to-back Belleville type washers 65 which also prevent rotation of the outer bearing race. Low pressure stage impeller 63 and high pressure stage impeller 64 are mounted at one end of the shaft 60, while permanent magnet rotor 67 is mounted at the opposite end thereof between bearings 61 and 62. The bearing 61 is held by bearing retainer 68 while bearing 62 is held by bearing retainer 66. A bore seal tube 70 extends between bearing retainer 68 and bearing retainer 66. An O-ring or gasket 71 may be provided in each of the bearing retainers 68 and 66 at both ends of the bore seal tube 70.

Low pressure stripper plate 76 and high pressure stripper plate 77 are disposed radially outward from low pressure impeller 63 and high pressure impeller 64, respectively. The permanent magnet rotor 67 on the shaft 60 is disposed to rotate within permanent magnet stator 166 which is disposed in the permanent magnet housing 69.

The low pressure impeller 63 is disposed to rotate between the low pressure stator channel plate 72 and the raid stator channel plate 73 while the high pressure impeller 64 is disposed to rotate between the mid stator channel plate 73 and the high pressure stator channel plate 74. Low pressure stripper plate 76 has a thickness slightly greater than the thickness of low pressure impeller 63 to provide a running clearance for the low pressure impeller 63 between low pressure stator channel plate 72 and mid stator channel plate 73 while high pressure stripper plate 77 has a thickness slightly greater than the thickness of high pressure impeller 64 to provide a running clearance for the high pressure impeller 64 between mid stator channel plate 73 and high pressure stator channel plate 74.

The low pressure stator channel plate 72 includes a generally horseshoe shaped fluid flow stator channel 78 having an inlet to receive fluid from the fluid inlet 56. The mid stator channel plate 73 includes a low pressure generally horseshoe shaped fluid flow stator channel 80 on the low pressure side thereof and a high pressure generally horseshoe shaped fluid flow stator channel 81 on the high pressure side thereof The low pressure generally horseshoe shaped fluid flow stator channel 80 on the low pressure side of the mid stator channel plate 73 mirrors the generally horseshoe shaped fluid flow stator channel 78 in the low pressure stator channel plate 72. The high pressure stator channel plate 74 includes a generally horseshoe shaped fluid flow stator channel 82 which mirrors the high pressure generally horseshoe shaped fluid flow stator channel 81 on the high pressure side of mid stator channel plate 73.

Each of the stator channels include an inlet and an outlet disposed radially outward from the channel. The inlets and outlets of the low pressure stator channel plate generally horseshoe shaped fluid flow stator channel 78 and mid helical flow stator channel plate low pressure generally horseshoe shaped fluid flow stator channel 80 are axially aligned as are the inlets and outlets of mid helical flow stator channel plate high pressure generally horseshoe shaped fluid flow stator channel 81 and high pressure stator channel plate generally horseshoe shaped fluid flow stator channel 82.

The gaseous fluid inlet 56 extends through both the low pressure stator channel plate 72 and low pressure stripper plate 76 to the inlets of both of the low pressure stator channel plate generally horseshoe shaped fluid flow stator channel 78 and the mid helical flow stator channel plate low pressure generally horseshoe shaped fluid flow stator channel 80. The gaseous fluid outlet 58 extends from the outlets of both the mid helical flow stator channel plate high pressure generally horseshoe shaped fluid flow stator channel 81 and the high pressure stator channel plate generally horseshoe shaped fluid flow stator channel 82 through the high pressure stator channel plate 74, through the high pressure stripper plate 77, through the mid stator channel plate 73, through the low pressure stripper plate 76, and finally through the low pressure stator channel plate 72.

The crossover from the low pressure compression stage to the high pressure compression stage is illustrated in FIG. 7. Both of the outlets from the low pressure stator channel plate generally horseshoe shaped fluid flow stator channel 78 and mid helical flow stator channel plate low pressure generally horseshoe shaped fluid flow stator channel 80 provide partially compressed fluid to the crossover 88 which in turn provides the partially compressed fluid to both inlets of mid helical flow stator channel plate high pressure generally horseshoe shaped fluid flow stator channel 81 and high pressure stator channel plate generally horseshoe shaped fluid flow stator channel 82.

The impeller blades or buckets are best illustrated in FIGS. 8, 9, and 11. The radial outward edge of the low pressure impeller 63 includes a plurality of low pressure blades 90 while the high pressure impeller 64 also includes a plurality of high pressure blades 91. While these blades 90 and 91 may be radially straight as shown in FIG. 8, there may be specific applications and/or operating conditions where curved blades may be more appropriate or required.

FIG. 9 illustrates a portion of a helical flow compressor/turbine impeller having a plurality of curved blades 71. The curved blade base or root 75 has less of a curve than the leading edge 79 thereof. The curved blade tip 82, at both the root 75 and leading edge 79 would be generally radial.

The fluid flow stator channels are best illustrated in FIG. 10 which shows the stator channel plate 73. The generally horseshoe shaped stator channel 80 is shown along with inlet 85 and outlet 86. The inlet 85 and outlet 86 would normally be relatively displaced approximately thirty (30) degrees. An alignment or locator hole 87 is provided in each of the low pressure stator channel plate 72, the mid stator channel plate 73 and the high pressure stator channel plate 74 as well as stripper plates 76 and 77. The inlet 85 is connected to the generally horseshoe shaped stator channel 80 by a converging nozzle passage 95 that converts fluid pressure energy into fluid velocity energy. Likewise, the other end of the generally horseshoe shaped stator channel 80 is connected to the outlet 86 by a diverging diffuser passage 96 that converts fluid velocity energy into fluid pressure energy. The fluid flow outlet for the generally horseshoe shaped stator channel 81 is shown as 99.

The depth and cross-sectional flow area of fluid flow stator channel 80 are tapered preferably so that the peripheral flow velocity need not vary as fluid pressure and density vary along the fluid flow channel. When compressing, the depth of the fluid flow stator channel 80 decreases from inlet to outlet as the pressure and density increases. Converging nozzle passage 95 and diverging diffuser passage 96 allow efficient conversion of fluid pressure energy into fluid velocity energy and vice versa.

In a helical flow compressor/turbine operating as a compressor, fluid enters the inlet port, is accelerated as it passes through the converging nozzle passage, is split into two (2) flow paths by a stripper plate, then enters the end of a generally horseshoe shaped stator channel axially adjacent to the impeller blades. The fluid is then directed radially inward to the root of the impeller blades by a pressure gradient, accelerated through and out of the blades by centrifugal force, from where it reenters the fluid flow stator channel. During this time the fluid has been traveling tangentially around the periphery of the helical flow compressor/turbine. As a result of this, the helical flow is established as best shown in FIGS. 8, 11, and 12.

The helical flow compressor/turbine is a regenerative type of machine in which the working fluid, in this case gaseous fuel, passes several times through a single impeller between the time it enters and leaves a given compression stage. The fluid energy rise per stage of compression is a function of the number of regenerations (up to fifteen) times the fluid energy rise during each passage through the impeller.

FIG. 11 shows the flow through the impeller blades and the fluid flow stator channels by means of streamlines 39. On the other hand, FIG. 12 schematically illustrates the helical flow around the center of the impeller-stator channel. The turning of the flow is illustrated by a ribbon of streamlines in FIG. 12. The generally circular line in FIG. 12 represents the center of the impeller-stator channel.

When the helical flow compressor/turbine functions as a compressor, the gaseous fuel upon leaving the impeller, has a greater tangential velocity than the gaseous fuel in the fluid flow stator channel. This high kinetic energy gaseous fuel decelerates and convert its kinetic or velocity energy into a potential or pressure energy and generates a pressure gradient around the fluid flow stator channel periphery. The gaseous fuel in the fluid flow stator channel, having less peripheral velocity than the gaseous fuel in the impeller blades, experiences a lower centrifugal force induced radial pressure gradient. Hence, there is a net radial pressure gradient in the fluid flow stator channel to direct the gaseous fuel to the impeller root and create regenerative flow.

FIG. 13 illustrates the fuel compression and control system of the present invention having two (2) helical flow compressor/turbines 14' and 14" in series. Each helical flow compressor/turbine 14' and 14" has a separate inverter drive 43' and 43" respectively which receives maximum speed and maximum torque control signals 46' and 46" from turbogenerator set power controller 15'. Partially compressed gaseous fuel is taken from the outlet 41' of the first helical flow compressor/turbine 14' and delivered to the inlet 40" of the second helical flow compressor/turbine 14" by gaseous fuel line 94.

An alternate representation of the helical flow compressor/turbine gaseous fuel compression and control system of the present invention is illustrated in FIG. 14. The elements common with FIG. 3 are preceded by the numeral 1 in FIG. 14; for example the helical flow compressor/turbine 14 of FIG. 3 is designated as helical flow compressor/turbine 114 in FIG. 14. In addition, the helical flow compressor/turbine motor inverter drive 143 is shown as receiving two hundred forty (240) volt electrical power via electrical supply line 195; and receiving a motor drive enable discrete signal 196 and speed/torque mode discrete signal 197 both from the turbogenerator set power controller 115, A fuel shutoff signal 198 from the turbogenerator set power controller 115 is provided to the fuel shutoff valve 199 between the gaseous fuel outlet pressure sensor 156 and turbogenerator 112. A fuel inlet shutoff valve 198 is provided in fuel inlet line 140.

FIG. 15 is a graph of the pressure rise across a single stage helical flow compressor versus fluid flow rate through the compressor for constant impeller speed. The dashed straight line is provided to illustrate the slope or curve of the pressure rise line.

The turbogenerator 12 is able to operate on whatever gaseous fuel is available in a pipeline, anywhere from six (6) inches water gauge at the low end to about fifty (50) psi gauge pressure at the top end. If the initial natural gas pressure is too high, the helical flow compressor/turbine 14 can be operated in a reverse direction to function as a turbine and reduce the pressure coming into the turbogenerator 12 so that the amount of fuel needed for initial ignition is obtained. That ignition then produces heat and turbine torque that accelerates the turbogenerator 12 which raises the pressure of the turbogenerator compressor 30. As the turbogenerator compressor 30 increases the pressure of the combustion air, the gaseous fuel pressure must be correspondingly increased to keep it somewhat higher so that there is a positive flow of gaseous fuel to the combustor nozzle injectors.

In order to start the system, the helical flow compressor/turbine motor 42 would normally be run backwards to overcome the upstream pressure of the gaseous fuel. The backward speed of the helical flow compressor/turbine 14 would be slowly reduced until there is a positive fuel flow to the combustor nozzle injectors while the turbogenerator is maintained at a constant speed ideal for the igniters. Light-off will occur when the correct fuel air ratio, a function of the combustion process, is achieved. Before light-off, the speed of the helical flow compressor/turbine is the controlling factor. After light-off, the controlling factor will be exhaust gas temperature during the remainder of the starting process. Once the light-off is completed the system will switch to a torque control mode.

The natural gas header pressure that is needed to operate the turbogenerator has to be extremely low for ignition. As the turbogenerator speed increases, the turbogenerator's compressor discharge pressure will increase up to as high as thirty seven (37) psi gauge. The natural gas pressure in the header that feeds the combustor nozzle injectors needs to be between three-tenths (0.3) psi above turbogenerator compressor discharge pressure to approximately a pound or pound and a half above turbogenerator compressor discharge pressure in order to accommodate gaseous fuel line losses or pressure drops in the various components in the gaseous fuel line to the combustor nozzle injectors.

For example, if the natural gas line pressure is twenty (20) psi gauge when you want to light-off, the pressure will have to be reduced by seventeen (17) or eighteen (18) psi when the turbogenerator is turning on low speed. As the turbogenerator speed increases, the pressure that goes into the header can be increased, that is the pressure needs to be reduced less. Ignition typically will occur while the helical flow compressor/turbine is still turning backwards and reducing pressure. It is only after the helical flow compressor/turbine ceases to function as a turbine and starts to function as a compressor that the system can function in a speed control mode.

When the helical flow compressor/turbine is operating at near zero speed, there is a very low gain in terms of the pressure rise since pressure rise is a function of speed squared. Once, however, the system is run in a torque control mode, the system is much more forgiving since any incremental change in torque will produce a well defined change in helical flow compressor discharge pressure. This system is capable of operating in either a speed-or torque control mode particularly if it is operating open loop. As currently configured, the system operates in a speed control mode for start up and a torque control mode for turbogenerator closed-loop exhaust gas temperature (egt) and speed control operation. With pressure sensors both upstream and downstream of the helical flow compressor/turbine, pressure rises can be detected and gains can be scheduled. The pressure sensors also permit fault diagnostics to advise if the helical flow compressor/turbine is leaking or if the extra pressure doesn't meet your requirements, for example, if the inlet gaseous fuel pressure is not within your specification range. Alternately, however, the pressure sensors can be simulated by virtue of algorithms.

Once you have light-off, exhaust gas temperature increases. If the turbogenerator speed is known, turbogenerator compressor discharge pressure can be calculated as can the gaseous fuel pressure. The gaseous fuel pipeline pressure normally does not change over a short period of time. Gaseous fuel pipeline pressure will, however, change significantly from winter to summer and even from night to day. If the gaseous fuel pipeline pressure is known, it is a simple matter to calculate what helical flow compressor/turbine speed is required to obtain the gaseous fuel pressure at the header for the combustor nozzle injectors. With header pressure known, the turbogenerator speed for any mode will be known. There is a direct relationship between helical flow compressor/turbine speed and turbogenerator speed for any turbogenerator load.

The torque on the helical flow compressor/turbine motor, a function of the helical flow compressor/turbine permanent magnet motor current, can readily be monitored. Alternately, the helical flow compressor/turbine can run with the impellers turning but no torque in the helical flow compressor/turbine motor or a torque from the helical flow compressor/turbine motor which is simply providing power for the bearings and windage drag. The system inherently includes four feedback signals. These are the speed of the turbogenerator which provides compressor discharge pressure, the turbogenerator output power, turbine exhaust gas temperature and ambient air temperature. When operating at any given condition and a change in power is required, even before a change in command is provided to the helical flow compressor/turbine, the change of conditions to satisfy the new power demand is known. In other words, it is not necessary to wait for an error to determine what is required to correct the error. This enables a less limited slew rate and permits more aggressive damping which means less overshoot risk and less authority for the integral controls.

In addition, there may be hardware implemented shutdown limits as a backup to the software limits and software which are in the system. While the limits of the software based limits are reached long before you actually hit the limits, the hardwired limits are really a strong safety clamp.

When the system is being operated at a constant speed and experiences an increase in load, the speed will start to drop until the gaseous fuel flow is increased to maintain a constant speed of the turbogenerator. When higher fuel flow is requested, a command is provided to the helical flow compressor/turbine to increase its speed to compensate for the change in power required. In an open loop, the speed is increased and then trimmed back to operate at peak efficiency. Unless the system is directly connected to a utility or can receive significant electrical power from batteries, turbogenerator output power cannot instantaneously be increased since output fuel flow cannot instantaneously be increased since turbogenerator turbine inlet temperature cannot instantaneously be increased.

The system will have both a transient temperature limit and a steady state temperature limit. The transient temperature limits will be higher than the steady state temperature limits so that a low transient change can be accommodated without any significant drop-off in turbogenerator speed. Energy is required to accelerate the helical flow compressor/turbine impellers and that energy has to come from somewhere. It is either taken from thermal energy or delivered energy or any combination of the two. The helical flow compressor/turbine has a lightweight impeller and thus has a better transient response time than other compressors.

If the turbogenerator load suddenly drops off significantly, the energy stored in the turbogenerator recuperator may require some kind of off-load bank, such as an electrical resistance bank to dissipate that energy. In stand-alone applications, a programmable device like a human interface will program a minimum load setting and a maximum load setting to prevent operating above a certain selected speed. Alternately, a valve can be utilized to simply dump discharge air pressure. It is simple to shut down the system if there is no longer any load by closing a solenoid valve upstream of the helical flow compressor/turbine. If you shut off the gaseous fuel flow, the system will essentially coast down to zero speed.

In deference to the hydrodynamic bearings on the turbogenerator, the system would normally be run down gradually or after a shut down the system would be restarted to run at a lower speed such as thirty thousand (30,000) or forty thousand (40,000) rpm to dissipate any heat remaining in the recuperator.

In most conventional systems, there would be a separate gaseous fuel helical flow compressor/turbine and a separate fuel metering valve. The system of the present invention eliminates the requirement for a separate metering valve. The helical flow compressor/turbine can effectively serve both functions of flow control and pressure control. By combining the fuel pressure and fuel flow control in the helical flow compressor/turbine, it is possible to maintain turbogenerator speed within plus or minus ten (10) rpm over a speed range of from approximately twenty four thousand (24,000) rpm to approximately ninety six thousand (96,000) rpm with a turbine exhaust gas temperature control within two (2) to three (3) degrees Fahrenheit. By primarily setting up pressure control such that a very small change in en turbogenerator speed makes a big change in flow, the turbogenerator essentially stabilizes itself Previous systems where the gaseous fuel compressor is run directly off the turbogenerator shaft with some kind of gear reduction, cannot even approximate this capability.

In order to provide a better understanding of the present invention, provided below are a series of sequential steps in a typical system operation of a system having an inlet shutoff valve, no inlet pressure sensor, a helical flow compressor/turbine permanent magnet motor/generator, an outlet pressure sensor and an outlet shutoff valve;

1. With inlet valve shut, open outlet valve.

2. Calibrate the outlet pressure sensor against atmospheric pressure.

3. Close outlet valve, pause, open inlet valve.

4. Using the just calibrated pressure sensor, determine the natural gas line pressure.

5. Close inlet valve.

6. Using the just calibrated pressure sensor to monitor pressure decay, determine if there are any gas leaks in the gaseous fuel compression and control system.

7. Compute the direction of rotation (usually backward) and approximate speed that the helical flow compressor/turbine must operate at (usually as a turbine) to provide the correct natural gas control system discharge pressure (usually about one psig) for combustor ignition at the turbogenerator ignition speed (usually about 16,000 rpm) for the current natural gas line pressure.

8. With outlet shut-off valve closed, set the helical flow compressor/turbine direction of rotation and speed to the computed value.

9. Trim the helical flow compressor/turbine speed to obtain the desired gaseous fuel control system discharge pressure for ignition (determined during previous start-ups) using the just calibrated pressure sensor.

10. Accelerate the turbogenerator to the ignition speed using available electric power, the turbogenerator's inverter and the turbogenerator's motor/generator operated as a motor.

11. Open the outlet shut-off valve.

12. Turn on the combustor ignitor.

13. Monitor the turbine discharge temperature for evidence of ignition.

14. If ignition does not occur in a short period (e.g. ½ second), increase fuel control discharge pressure at a predetermine pressure versus time rate by changing the speed of the helical flow compressor/turbine (typically reducing its backward speed).

15. When ignition occurs (as evidenced by an increase in turbine discharge temperature), computer log the filel control discharge pressure at which ignition occurred so that on the subsequent start cycles, this updated pressure can be set in step 9.

16. Turn off the combustor ignitor.

17. Accelerate the turbogenerator at a predetermined rate (speed versus time) until it reaches a speed moderately above the self sustaining speed (usually about 25,000 rpm) using available electric power, the turbogenerator's inverter and the turbogenerator's motor/generator operated as a motor. During this acceleration, the electrical power input to the turbogenerator's motor will decline as the turbogenerator's combustion driven turbine generates increasing shaft torque and power. During this acceleration the turbogenerator's centrifugal compressor discharge pressure increases (nominally with the square of turbogenerator speed). The fuel control system must deliver natural gas to the combustor nozzles at a pressure slightly above the centrifugal compressors discharge pressure in order for the fuel to enter the combustor and sustain combustion. Fuel flow rate, combustion temperature and turbine torque are strong functions of the small difference between the fuel control discharge pressure and the centrifugal compressor discharge pressure. There is, therefore, a relatively stable turbogenerator speed (that varies slightly with turbogenerator output power) for every level of fuel control discharge pressure. Thus, during this acceleration the fuel control system must continually adjust the helical flow compressor/turbine shaft torque direction and level so as to assure the desired turbine discharge temperature which is predefined as a function of turbogenerator speed.

18. When the turbogenerator has reached a speed at which no electrical power is required to accelerate it at the desired rate, continue to accelerate the turbogenerator to a yet higher speed with no electrical power being either utilized by or generated by the turbogenerator's permanent magnet motor/generator but rather utilizing for acceleration the combustion driven turbine torque. During this acceleration the fuel control system must set the helical flow compressor/turbine shaft torque direction and level so as to assure that the turbine discharge temperature is held within an acceptable range which is defined as a function of turbogenerator speed (too low and flame out occurs, too high and structural damage can occur) and so as to assure that the desired speed versus time and maximum speed setting are achieved.

19. Connect electrical load to the turbogenerator's generator either directly or through its inverter.

20. This step of the operation sequence represents the normal operating condition for the gaseous fuel compression and control system and for the turbogenerator. The fuel control system must continually adjust the helical flow compressor/turbine shaft torque direction and level so as to assure that the desired turbine discharge temperature is held near the maximum value for each turbogenerator speed using a slow servo control loop and is held at the desired turbogenerator speed for the current output power using a fast servo control loop.

Most turbogenerators operating with a low natural gas pressure will utilize a reciprocating compressor with a sitty (60) cycle phase motor to pump up the natural gas pressure to somewhere in the range of one hundred (100) psi gauge. This one hundred (100) psi gas is then stored in a pressure vessel or accumulator. An accumulator is required because the reciprocating compressor produces pressure pulsations and flow pulsations which, if applied directly to the combustor nozzles, could produce combustor rumble and/or blow out the combustor flame. A large accumulator will smooth out these pulsations or variations. In addition, the reciprocating compressor is cycled on and off since if run continuously it would continue to build up pressure. For example, the reciprocating compressor would run until the pressure in the accumulator reached one hundred ten (110) psi and then would be shut off until the pressure went down to eighty (80) psi when it again would be turned on. The accumulator is required to compensate for this on/off cycling which is of considerably longer duration than the pressure pulsations from the reciprocating compressor.

Once the accumulator has a stabilized natural gas pressure, the pressure must be reduced in a pressure regulator to a pressure which will always be below the lowest pressure in the accumulator. A flow control valve is then used to determine the natural gas flow to the combustor nozzle injectors. The flow control valve is usually computer controlled with the computer receiving information about turbogenerator speed, turbine exhaust gas temperature, and required turbogenerator power. The amount of natural gas flowing through the flow control valve would be a function of these three (3) parameters and their rate of change.

This type of system is relatively complicated and throws a lot of energy away by first compressing to a higher pressure than is required and then reducing the natural gas pressure to that which is actually required. It is also a fairly large system and requires a lot of power to produce the natural gas compression. Further, reciprocating compressors are typically oil lubricated and thus require oil removal systems. If the oil removal systems do not function to prevent oil from getting into the combustion process, the surface and walls of the combustor can be contaminated and varnish can build up on the nozzle injectors and other combustor components.

The helical flow compressor/turbine system of the present invention overcomes all of the above disadvantages of a reciprocating gaseous fuel compressor system.

While specific embodiments of the invention have been illustrated and described, it is to be understood that these are provided by way of example only and that the invention is not to be construed as being limited thereto but only by the proper scope of the following claims.

What we claim is:

1. A gaseous fuel compression and control system, comprising:

a turbogenerator set including a turbogenerator and turbogenerator power controller, said turbogenerator including a compressor, a turbine, a combustor with a plurality of gaseous fuel nozzles and a plurality of air inlets, a recuperator, and a permanent magnet motor/generator;

a first helical flow compressor/turbine;

a first motor operably associated with said first helical flow compressor/turbine to drive said first helical flow compressor/turbine;

a first helical flow compressor/turbine motor inverter drive operably associated with said first helical flow compressor/turbine motor to provide electrical power to said first helical flow compressor/turbine motor and receive operational data from said first helical flow compressor/turbine motor;

a second helical flow compressor/turbine;

a second motor operably associated with said second helical flow compressor/turbine to drive said second helical flow compressor/turbine; and a second helical flow compressor/turbine motor inverter drive operably associated with said second helical flow compressor/turbine motor to provide electrical power to said second helical flow compressor/turbine motor and receive operational data from said second helical flow compressor/turbine motor;

said first helical flow compressor/turbine receiving gaseous fuel and supplying intermediately pressurized gaseous fuel to the second helical flow compressor/turbine and said second helical flow compressor/turbine supplying pressurized gaseous fuel to the gaseous fuel nozzles of said turbogenerator combustor, said turbogenerator compressor/turbine supplying compressed combustion air to said air inlets of said turbogenerator combustor, said first and said second helical flow compressor/turbine motor inverter drives also operably associated with said turbogenerator power controller to receive control signals from said turbogenerator power controller, said turbogenerator power controller also receiving operational data from said helical flow compressor/turbine motor inverter and turbogenerator parameter signals from said turbogenerator.

2. The gaseous fuel compression and control system of claim 1 wherein said first motor for said first helical flow compressor/turbine and said second motor for said second helical flow compressor/turbine are permanent magnet motor/generators.

3. The gaseous fuel compression and control system of claim 2 wherein said first helical flow compressor/turbine and said first permanent magnet motor/generator share a first common shaft, and said second helical flow compressor/turbine and said second permanent magnet motor/generator share a second common shaft.

4. The gaseous fuel compression and control system of claim 3 wherein said first helical flow compressor/turbine and first permanent magnet motor/generator on a first common shaft, and said second helical flow compressor/turbine and second permanent magnet motor/generator on a second common shaft each comprise:

a housing including a permanent magnet stator positioned at one end thereof;

a shaft rotatably supported within said housing; a permanent magnet rotor mounted on said shaft at said one end thereof and operably associated with said permanent magnet stator; and an impeller mounted at the other end of said shaft, said impeller having at least one row of a plurality of blades, said housing including a generally horseshoe shaped fluid flow stator channel operably associated with each row of the plurality of impeller blades, a fluid inlet at one end of said generally horseshoe shaped fluid flow stator channel, and a fluid outlet at the other end of said generally horseshoe shaped fluid flow stator channel, the fluid in said generally horseshoe shaped fluid flow stator channel proceeding from said fluid inlet to said fluid outlet while following a generally helical flow path with multiple passes through said impeller blades.

5. The gaseous fuel compression and control system of claim 3 wherein said first helical flow compressor/turbine and first permanent magnet motor/generator on a first common shaft, and said second helical flow compressor/turbine and second permanent magnet motor/generator on a second common shaft each comprise:

a housing including a permanent magnet stator positioned at one end thereof;

a shaft rotatably supported within said housing;

a permanent magnet rotor mounted on said shaft at said one end thereof and operably associated with said permanent magnet stator; and an impeller mounted at an other end of said shaft, said impeller having two rows each of a plurality of blades, with one row of said plurality of blades disposed on either side of the outer periphery of said impeller, said housing including two generally horseshoe shaped fluid flow stator channels with one of said two generally horseshoe shaped fluid flow stator channels operably associated with one of said two rows of impeller blades and the other of said two generally horseshoe shaped fluid flow stator channels operably associated with the other of said two rows of impeller blades, said housing also including a stripper plate disposed radially outward from said impeller, a fluid inlet at one end of each of said two generally horseshoe shaped fluid flow stator channels, and a fluid outlet at the other end of each of said two generally horseshoe shaped fluid flow stator channels, the fluid in each of said generally horseshoe shaped fluid flow stator channels proceeding from its fluid inlet to its fluid outlet while following a generally helical flow path with multiple passes through said impeller blades operably associated with said generally horseshoe shaped fluid flow stator channel.

6. The gaseous fuel compression and control system of claim 3 wherein said first helical flow compressor/turbine and first permanent magnet motor/generator on a first common shaft, and said second helical flow compressor/turbine and second permanent magnet motor/generator on a second common shaft each comprise:

a housing including a permanent magnet stator positioned at one end thereof;

a shaft rotatably supported within said housing;

a permanent magnet rotor mounted on said shaft at one end thereof and operably associated with said permanent magnet stator;

a low pressure impeller mounted at an other end of said shaft, said low pressure impeller having two rows each of a plurality of blades, with one row of said plurality of blades disposed on either side of the radially outward edge of said low pressure impeller;

a high pressure impeller mounted at the other end of said shaft, said high pressure impeller having two rows each of a plurality of blades, with one row of said plurality of blades disposed on either side of the radially outward edge of said high pressure impeller;

said housing including a mid stator channel plate disposed between said low pressure impeller and said high pressure impeller, a first pair of generally horseshoe shaped fluid flow stator channels with one of said first pair of generally horseshoe shaped fluid flow stator channels operably associated with one of said two rows of low pressure impeller blades and the other of said first pair of generally horseshoe shaped fluid flow stator channels operably associated with the other of said two rows of low pressure impeller blades, and a second pair generally horseshoe shaped fluid flow stator channels with one of said second pair of generally horseshoe shaped fluid flow stator channels operably associated with one of said two rows of high pressure impeller blades and the other of said second pair of generally horseshoe shaped fluid flow stator channels operably associated with the other of said two rows of high pressure impeller blades, said housing also including a low pressure stripper plate disposed radially outward of said low pressure impeller, a high pressure stripper plate disposed radially outward of said high pressure impeller, a fluid inlet at one end of each of said first pair of generally horseshoe shaped fluid flow stator channels, and a fluid outlet at the other end of said first pair of said generally horseshoe shaped fluid flow stator channels and a fluid inlet at one end of each of said second pair of generally horseshoe shaped fluid flow stator channels and a fluid outlet at the other end of said second pair of said generally horseshoe shaped fluid flow stator channels, said inlet of said second pair of said generally horseshoe shaped fluid flow stator channels communicating with the outlet of said first pair of said generally horseshoe shaped fluid flow stator channels, the fluid in each of said generally horseshoe shaped fluid flow stator channels making multiple generally helical passes between said generally horseshoe shaped fluid flow stator channel and said impeller blades as the fluid proceeds from said inlet to said outlet of said generally horseshoe shaped fluid flow stator channel.

7. The gaseous fuel compression and control system of claim 3 wherein said first helical flow compressor/turbine and first permanent magnet motor/generator on a first common shaft, and said second helical flow compressor/turbine and second permanent magnet motor/generator on a second common shaft each comprise:

a housing;

a permanent magnet stator mounted within said housing at one end thereof;

a shaft rotatably supported within said housing by a pair of journal bearings;

a permanent magnet rotor mounted on said shaft between said pair of journal bearings, said permanent magnet rotor disposed on said shaft to rotate within said permanent magnet stator mounted at one end of said housing;

a low pressure impeller mounted at an other end of said shaft, said low pressure impeller having two rows each of a plurality of blades, with one row of said plurality of blades disposed on either side of the radially outward edge of said low pressure impeller;

a high pressure impeller mounted at the other end of said shaft, said high pressure impeller having two rows each of a plurality of blades, with one row of said plurality of blades disposed on either side of the radially outward edge of said high pressure impeller;

said housing including a mid stator channel plate disposed between said low pressure impeller and said high pressure impeller, a first pair of generally horseshoe shaped fluid flow stator channels with one of said first pair of generally horseshoe shaped fluid flow stator channels operably associated with one of said two rows of low pressure impeller blades and the other of said first pair of generally horseshoe shaped fluid flow stator channels operably associated with the other of said two rows of low pressure impeller blades, and a second pair generally horseshoe shaped fluid flow stator channels with one of said second pair of generally horseshoe shaped fluid flow stator channels operably associated with one of said two rows of high pressure impeller blades and the other of said second pair of generally horseshoe shaped fluid flow stator channels operably associated with the other of said two rows of high pressure impeller blades, said housing also including a low pressure stripper plate disposed radially outward of said low pressure impeller, a high pressure stripper plate disposed radially outward of said high pressure impeller, a fluid inlet at one end of each of said first pair of generally horseshoe shaped fluid flow stator channels, and a fluid outlet at the other end of said first pair of said generally horseshoe shaped fluid flow stator channels and a fluid inlet at one end of each of said second pair of generally horseshoe shaped fluid flow stator channels and a fluid outlet at the other end of said second pair of said generally horseshoe shaped fluid flow stator channels, said inlet of said second pair of said generally horseshoe shaped fluid flow stator channels communicating with the outlet of said first pair of said generally horseshoe shaped fluid flow stator channels, the fluid in each of said generally horseshoe shaped fluid flow stator channels making multiple generally helical passes between said generally horseshoe shaped fluid flow stator channel and said impeller blades as the fluid proceeds from said inlet to said outlet of said generally horseshoe shaped fluid flow stator channel.

8. The gaseous fuel compression and control system of claim 3 wherein said first helical flow compressor/turbine and first permanent magnet motor/generator on a first common shaft, and said second helical flow compressor/turbine and second permanent magnet motor/generator on a second common shaft each comprise:

a housing including a permanent magnet stator positioned at one end thereof, a shaft rotatably supported within said housing;

a permanent magnet rotor mounted on said shaft at said one end thereof and operably associated with said permanent magnet stator;

a low pressure impeller mounted at an other end of said shaft, said low pressure impeller having two rows each of a plurality of blades, with one row of said plurality of blades disposed on either side of the outer periphery of said impeller;

a high pressure impeller mounted at the other end of said shaft, said high pressure impeller having two rows each of a plurality of blades, with one row of said plurality of blades disposed on either side of the outer periphery of said high pressure impeller;

said housing including a mid stator channel plate disposed between said low pressure impeller and said high pressure impeller, a first pair of generally horseshoe shaped fluid flow stator channels with one of said first pair of generally horseshoe shaped fluid flow stator channels operably associated with one of said two rows of low pressure impeller blades and the other of said first pair of generally horseshoe shaped fluid flow stator channels operably associated with the other of said two rows of low pressure impeller blades, and a second pair of generally horseshoe shaped fluid flow stator channels with one of said second pair of generally horseshoe shaped fluid flow stator channels operably associated with one of said two rows of high pressure impeller blades and the other of said second pair of generally horseshoe shaped fluid flow stator channels operably associated with the other of said two rows of high pressure impeller blades, said housing also including a low pressure stripper plate disposed radially outward of said low pressure impeller and a high pressure stripper plate disposed radially outward of said high pressure impeller, said low pressure stripper plate having a slightly greater thickness than said low pressure impeller and said high pressure stripper plate having a slightly greater thickness than said high pressure impeller, said housing further including a fluid inlet at one end of each of said first pair of generally horseshoe shaped fluid flow stator channels, and a fluid outlet at the other end of said first pair of said generally horseshoe shaped fluid flow stator channels and a fluid inlet to one end of each of said second pair of generally horseshoe shaped fluid flow stator channels and a fluid outlet at the other end of each of said second pair of said generally horseshoe shaped fluid flow stator channels, said inlet of said second pair of said generally horseshoe shaped fluid flow stator channels communicating with the outlet of said first pair of said generally horseshoe shaped fluid flow stator channels, the fluid in each of said generally horseshoe shaped fluid flow stator channels making multiple generally helical passes between said generally horseshoe shaped fluid flow stator channel and said impeller blades as the fluid proceeds from said inlet to said outlet of said generally horseshoe shaped fluid flow stator channel.

9. The gaseous fuel compression and control system of claim 1 wherein said operational data received by said first helical flow compressor/turbine motor inverter from said first helical flow compressor/turbine motor includes motor phase data, and said operational data received by said second helical flow compressor/turbine motor inverter from said second helical flow compressor/turbine motor includes motor phase data.

10. The gaseous fuel compression and control system of claim 1 wherein said operational data received by said first helical flow compressor/turbine motor inverter from said first helical flow compressor/turbine motor includes motor speed data, and said operational data received by said second helical flow compressor/turbine motor inverter from said second helical flow compressor/turbine motor includes motor speed data.

11. The gaseous fuel compression and control system of claim 1 wherein said operational data received by said first helical flow compressor/turbine motor inverter from said first helical flow compressor/turbine motor includes both motor phase data and motor speed data, and said operational data received by said second helical flow compressor/turbine motor inverter from said second helical flow compressor/turbine motor includes both motor phase data and motor speed data.

12. The gaseous fuel compression and control system of claim 1 wherein said control signals received by said first helical flow compressor/turbine motor inverter drive from said turbogenerator power controller include a torque control signal, and said control signals received by said second helical flow compressor/turbine motor inverter drive from said turbogenerator power controller include a torque control signal.

13. The gaseous fuel compression and control system of claim 1 wherein said control signals received by said first helical flow compressor/turbine motor inverter drive from said turbogenerator power controller include a speed control signal, and said control signals received by said second helical flow compressor/turbine motor inverter drive from said turbogenerator power controller include a speed control signal.

14. The gaseous fuel compression and control system of claim 1 wherein said control signals received by said first helical flow compressor/turbine motor inverter drive from said turbogenerator power controller include a maximum speed control signal and a torque control signal, and said control signals received by said second helical flow compressor/turbine motor inverter drive from said turbogenerator power controller include a maximum speed control signal and a torque control signal.

15. The gaseous fuel compression and control system of claim 1 wherein said turbogenerator parameter signals received by said turbogenerator power controller include turbogenerator speed.

16. The gaseous fuel compression and control system of claim 1 wherein said turbogenerator parameter signals received by said turbogenerator power controller include turbogenerator turbine exhaust gas temperature.

17. The gaseous fuel compression and control system of claim 1 wherein said turbogenerator parameter signals received by said turbogenerator power controller include turbogenerator speed and turbogenerator exhaust gas temperature.

18. The gaseous fuel compression and control system of claim 1 wherein said first helical flow compressor/turbine inlet includes a pressure sensor to provide an inlet pressure signal to said turbogenerator power controller.

19. The gaseous fuel compression and control system of claim 1 wherein said second helical flow compressor/turbine outlet includes a pressure sensor to provide an outlet pressure signal to said turbogenerator power controller.

20. The gaseous fuel compression and control system of claim 1 wherein said first helical flow compressor/turbine inlet includes a pressure sensor to provide an inlet pressure signal to said turbogenerator power controller, and said second helical flow compressor/turbine outlet includes a pressure sensor to provide an outlet pressure signal to said turbogenerator power controller.

* * * * *

UNITED STATES PATENT AND TRADEMARK OFFICE
CERTIFICATE OF CORRECTION

PATENT NO. : 5,850,733
DATED : December 22, 1998
INVENTOR(S) : Robert W. Bosley et al.

It is certified that error appears in the above-identified patent and that said Letters Patent is hereby corrected as shown below:

On the title page item [54], and column 1, line 1,
Change the Title to "GASEOUS FUEL COMPRESSION AND CONTROL SYSTEM"
Column 6, line 1, change "shut-offvalve" to --shut-off valve--
Column 8, line 47, change "servo control" to --servocontrol--
Column 8, line 51, change "filel" to --fuel--
Column 10, line 53, change "filel" to --fuel--
Column 11, line 4, change "filel" to --fuel--
Column 11, line 9, change "filel" to --fuel--
Column 14, line 4, change ")" to --,--
Column 14, line 42, change "raid" to --mid--
Column 16, line 43, after "fuel" insert --,--
Column 17, line 11, change "115," to --115.--
Column 19, line 60, delete "en"
Column 19, line 62, after "itself" insert --.--
Column 20, line 43, change "filel" to --fuel--
Column 21, line 33, change "servo control" to --servocontrol--
Column 21, line 35, change "servo control" to --servocontrol--
Column 21, line 37, change "sitty" to --sixty--
Claim 8, line 8, change "." to --;--

Signed and Sealed this

Thirtieth Day of March, 1999

Attest:

Q. TODD DICKINSON

Attesting Officer

Acting Commissioner of Patents and Trademarks